(12) United States Patent
Bae

(10) Patent No.: US 12,096,904 B2
(45) Date of Patent: Sep. 24, 2024

(54) MOVABLE DEVICE USABLE FOR CLEANING AND MOVABLE DEVICE CONTROL METHOD

(71) Applicant: Jin Sik Bae, Seoul (KR)

(72) Inventor: Jin Sik Bae, Seoul (KR)

( * ) Notice: Subject to any disclaimer, the term of this patent is extended or adjusted under 35 U.S.C. 154(b) by 631 days.

(21) Appl. No.: 17/299,973

(22) PCT Filed: Dec. 12, 2019

(86) PCT No.: PCT/KR2019/017595
§ 371 (c)(1),
(2) Date: Jun. 4, 2021

(87) PCT Pub. No.: WO2020/122636
PCT Pub. Date: Jun. 18, 2020

(65) Prior Publication Data
US 2022/0017220 A1 Jan. 20, 2022

(30) Foreign Application Priority Data

Dec. 12, 2018 (KR) .......................... 10-2018-0160304

(51) Int. Cl.
| | |
|---|---|
| *A47L 5/12* | (2006.01) |
| *A47L 9/12* | (2006.01) |
| *B64C 15/02* | (2006.01) |
| *B64U 10/14* | (2023.01) |
| *B64U 30/26* | (2023.01) |

(Continued)

(52) U.S. Cl.
CPC ................ *A47L 5/12* (2013.01); *A47L 9/122* (2013.01); *B64C 15/02* (2013.01); *B64U 30/26* (2023.01); *B64U 50/34* (2023.01); *B64U 10/14* (2023.01); *B64U 2101/29* (2023.01); *B64U 2101/30* (2023.01)

(58) Field of Classification Search
CPC ....... A47L 5/12; B64U 2101/29; B64U 30/26; B64U 15/02; B64U 50/34
See application file for complete search history.

(56) References Cited

U.S. PATENT DOCUMENTS

| | | | | |
|---|---|---|---|---|
| 5,054,713 A | * | 10/1991 | Langley | ................ B64C 39/001 244/73 C |
| 8,991,740 B2 | * | 3/2015 | Olm | ...................... B64U 10/70 244/50 |

(Continued)

FOREIGN PATENT DOCUMENTS

| | | |
|---|---|---|
| JP | 2018-39420 | 3/2018 |
| KR | 10-2016-0141604 | 12/2016 |

(Continued)

*Primary Examiner* — Michael C Zarroli
*Assistant Examiner* — Peter A Taraschi
(74) *Attorney, Agent, or Firm* — LEX IP MEISTER, PLLC

(57) ABSTRACT

A movable device includes: at least one lift generating unit for generating a pressure difference between opposite sides thereof to generate a lift force; a movable device body connected to the lift generating unit to be movable by the lift force generated by the lift generating unit; and at least one supply duct, the number of which corresponds to the number of the lift generating unit. One end of the supply duct is disposed on one side of the lift generating unit and, when the lift generating unit operates, fluid is suctioned through the other end of the supply duct to be supplied into the lift generating unit.

12 Claims, 23 Drawing Sheets

(51) Int. Cl.
*B64U 50/34* (2023.01)
*B64U 101/29* (2023.01)
*B64U 101/30* (2023.01)

(56) References Cited

U.S. PATENT DOCUMENTS

| | | | |
|---|---|---|---|
| 2002/0125366 | A1 | 9/2002 | Salas |
| 2011/0307127 | A1* | 12/2011 | Swenson ................ F02B 37/16 |
| | | | 60/605.1 |
| 2015/0274289 | A1* | 10/2015 | Newman ............. B64C 29/0008 |
| | | | 244/12.4 |
| 2016/0325834 | A1* | 11/2016 | Foster ................... B64C 39/024 |
| 2017/0113798 | A1* | 4/2017 | Lee ....................... B64C 39/024 |
| 2019/0076852 | A1 | 3/2019 | Luo et al. |

FOREIGN PATENT DOCUMENTS

| | | | | |
|---|---|---|---|---|
| WO | WO-2017043599 A1 * | 3/2017 | ............... | B03C 3/02 |
| WO | WO-2018153281 A1 * | 8/2018 | ............... | A47L 5/12 |

* cited by examiner

MOVABLE DEVICE USABLE FOR CLEANING AND MOVABLE DEVICE CONTROL METHOD

TECHNICAL FIELD

The present disclosure relates to a movable device using lift force, thrust force, rotation force, etc., and a movable device control method.

BACKGROUND ART

Drone is a generic term for an unmanned aerial vehicle (UAV) in the shape of an airplane or helicopter that can fly and maneuver, and has been used in various civilian fields in addition to military purposes since around the 2010s. In a flying object that generates lift force by rotation of rotating blades such as a rotor, such as a helicopter or a drone, the body of the flying object is rotated in a direction opposite to a rotating direction of the rotor by the reaction of the rotation. A single rotor helicopter requires a tail rotor to solve the above problem, but in the drones, the principle that front and rear rotors are rotated in opposite directions to cancel the reaction caused by the rotor rotation is fundamentally applied. A movable device using a plurality of rotating blades controls each rotor rotation to obtain lift force while simultaneously controlling flight direction or posture thereof.

When the rotor of the movable device is rotated, a difference in atmospheric pressure occurs on upper and lower sides around the rotor, and lift force is generated from the pressure difference. In a general movable device, intake and exhaust of air generated by the pressure difference are used only for the flight of the movable device.

DISCLOSURE

Technical Problem

Accordingly, the present disclosure has been made keeping in mind the above problems occurring in the related art, and an objective of the present disclosure is to provide a movable device using lift force, and a movable device control method.

Technical Solution

In order to accomplish the above objective, according to an embodiment of the present disclosure, a movable device includes: a lift generating unit configured to generate a pressure difference between opposite sides thereof to generate lift force; a movable device body connected to the lift generating unit to be movable by means of the lift force generated by the lift generating unit; and a supply duct of which the number corresponds to the number of the lift generating unit, the supply duct having a first end that is arranged on a first side of the lift generating unit, and a second end that suctions fluid to supply the fluid into the lift generating unit when the lift generating unit is operated.

According to the embodiment of the present disclosure, a movable device may include a lift-thrust generation part, a movable device body, a supply duct, and a coupling part, wherein the movable device may be configured such that the lift-thrust generation part may generate a pressure difference between a first space and a second space partitioned centered on the lift-thrust generation part so as to generate lift force or a thrust force, the movable device body may be connected to the lift-thrust generation part to be movable by the lift force generated by the lift-thrust generation part, the number of supply duct may be set to correspond to the number of lift-thrust generation part, a first end of the supply duct may be arranged at a first side of the lift-thrust generation part and suction fluid from a second end thereof when the lift-thrust generation part is operated to supply the fluid to the lift-thrust generation part, the coupling part may be located at the second end of the supply duct, and various modules may be coupled to the coupling part to perform a mission of the movable device.

According to an embodiment of the present disclosure, a movable device control method, the method controlling a movable device comprising a plurality of rotors for generating lift force, and a plurality of supply ducts configured to supply fluid suctioned to a first side of each of the rotors, the number of supply ducts being set to correspond to the number of rotors, the method including: moving the movable device while the rotors are rotated and generate the lift force; and controlling posture of the movable device by moving at least one of the plurality of supply ducts and deviating the supply duct from the first side of the one of the rotors corresponding to the supply duct.

Advantageous Effects

Accordingly, operation such as cleaning may be performed by the movable device using a suction force generated when lift force is generated.

The posture control of the movable device can be performed without controlling a rotation speed of the rotor.

The noise generated by the rotation of the rotor can be reduced.

The movable device can generate suction force and discharge force when lift force is generated and thus can be used by being coupled to any module, such as fans, air purifiers, ball launchers, and ammunition launchers that require the forces.

The movable device can generate lift force and thrust force as much as the user wants, so when the movable device is operated while a module is mounted thereto, the movable device can be moved to a desired location with a simple control and a small force.

BEST MODE

Figure 1:
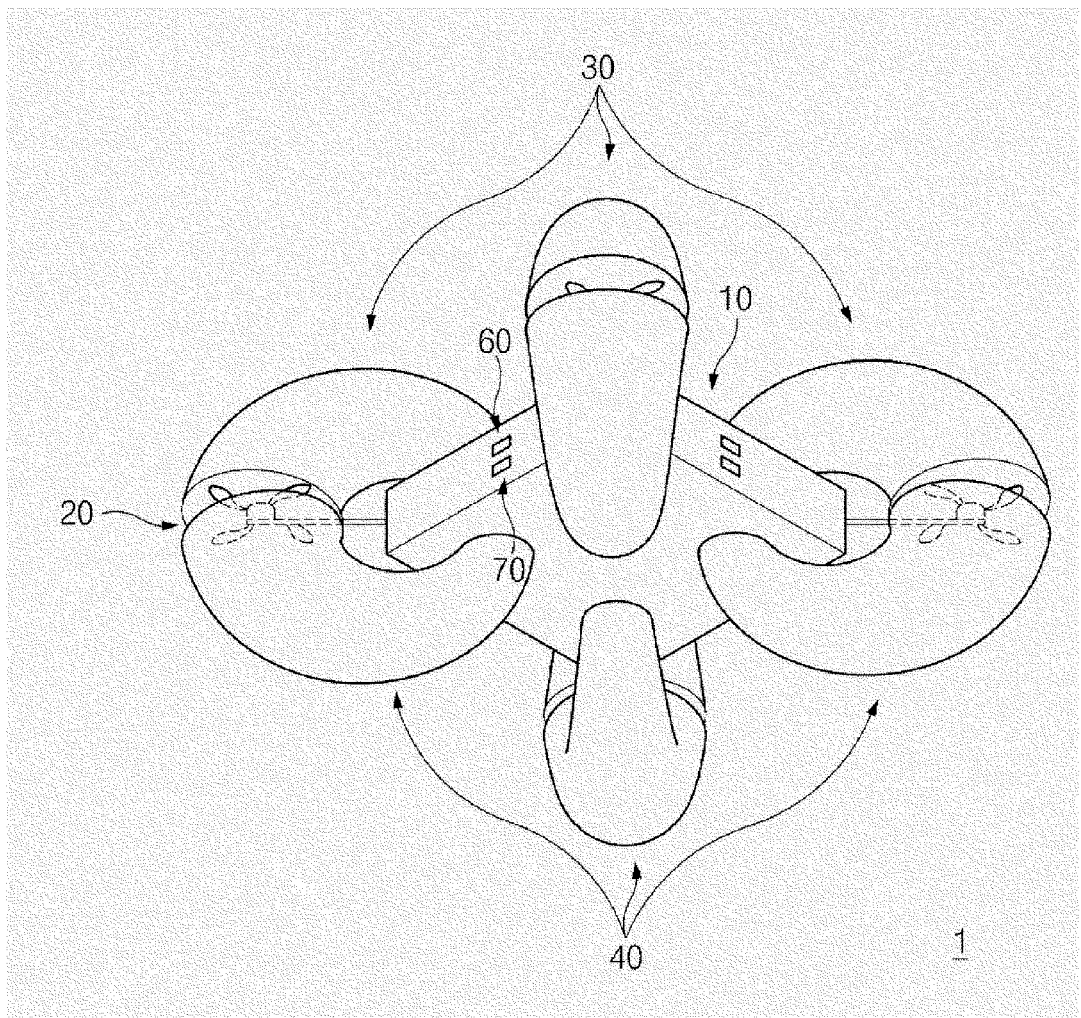
FIG. 1 is a lower surface perspective view showing a movable device according to an embodiment of the present disclosure.

Hereinbelow, several embodiments of the present disclosure will be described in detail with reference to accompanying drawings. Like reference numerals are used to identify like elements throughout different drawings. Further, in the following description, if it is decided that the detailed description of known function or configuration related to the invention makes the subject matter of the invention unclear, the detailed description is omitted.

Further, when describing the components of the present disclosure, terms such as first, second, A, B, (a), and (b) may be used. Since these terms are provided merely for the purpose of distinguishing the components from each other, they do not limit the nature, sequence, or order of the components. It will be understood that when an element is referred to as being "connected", "combined", or "coupled" to another element, it can be directly connected, combined, or coupled to the other element or intervening elements may be present.

DESCRIPTION OF REFERENCE NUMERALS 1, 2, 3: movable device
10: movable device body
11: main body part
12: rotor connector
20: rotor
30: supply duct
35: supply duct joint
40, 451: return duct
51: first mooring space
52: second mooring space
60, 65: suction duct
70: discharge duct
80: controller
90: cleaner module
91: suction member
92: debris collecting portion
93: filter portion
94: discharge portion
131: return connection portion
314: auxiliary opening
1010: supply duct coupling part
1020: supply duct support portion
1030: return duct coupling portion
1190: launcher module
1290: balloon robot arm
1390: fixed blade
1490: combination part
1500: guide
D: debris

MODE FOR INVENTION

Figure 2:
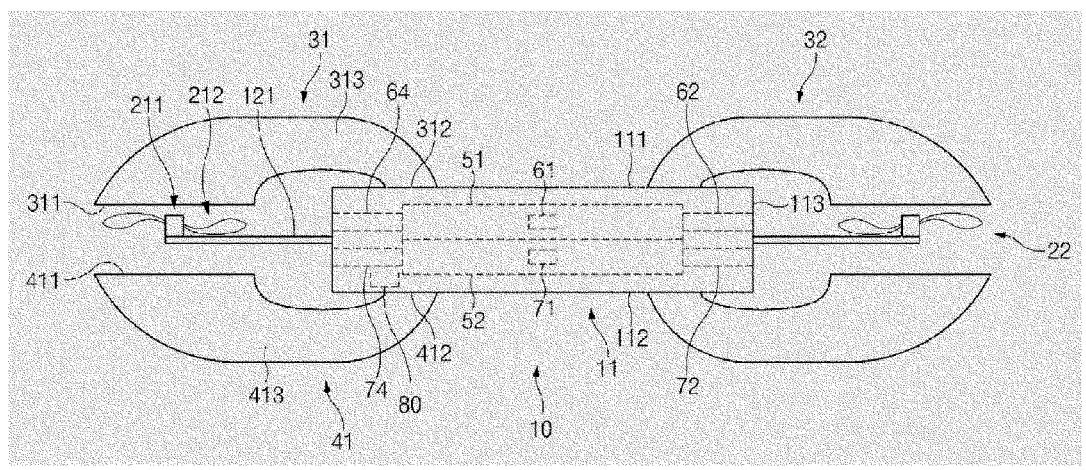
FIG. 2 is a front view showing the movable device according to the embodiment of the present disclosure.
Figure 3:
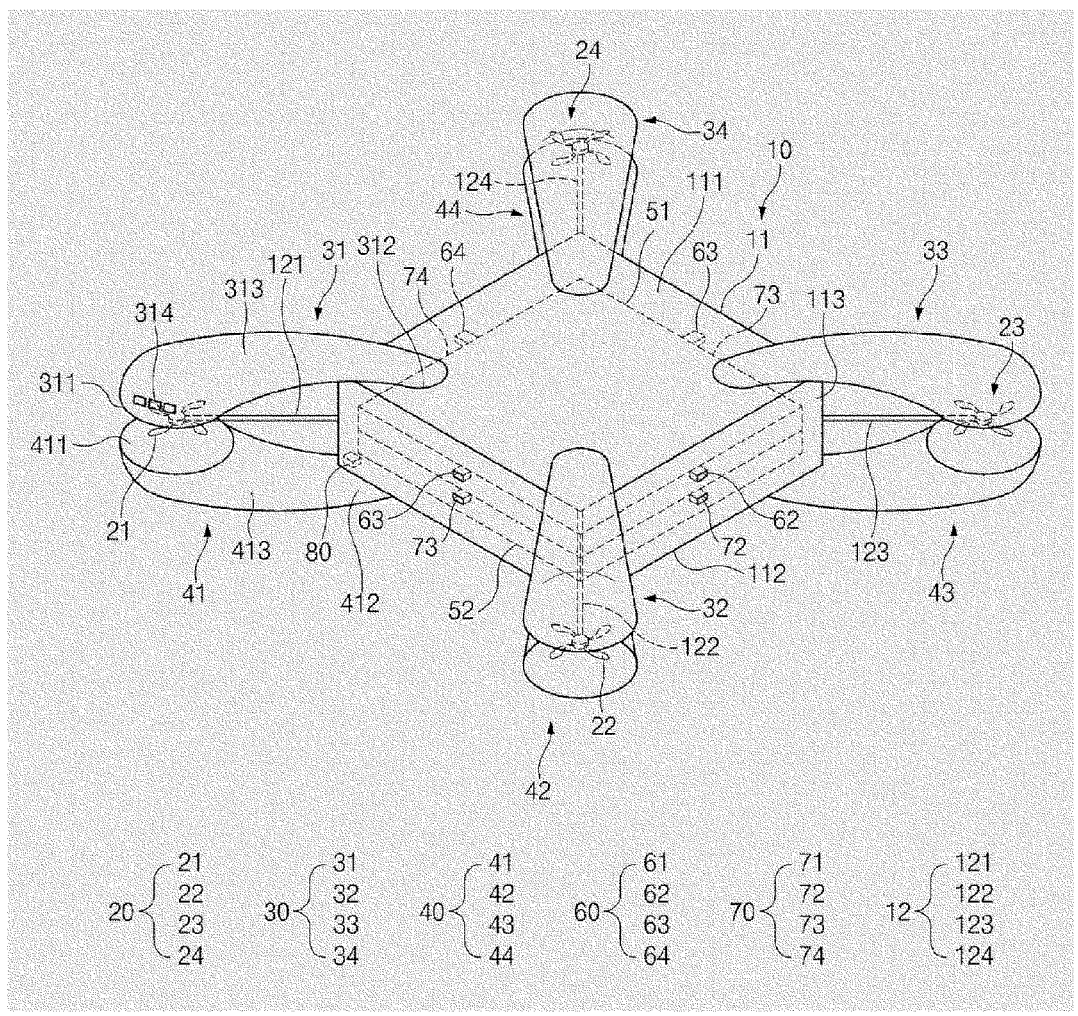
FIG. 3 is a perspective view showing the movable device according to the embodiment of the present disclosure.
Figure 4:
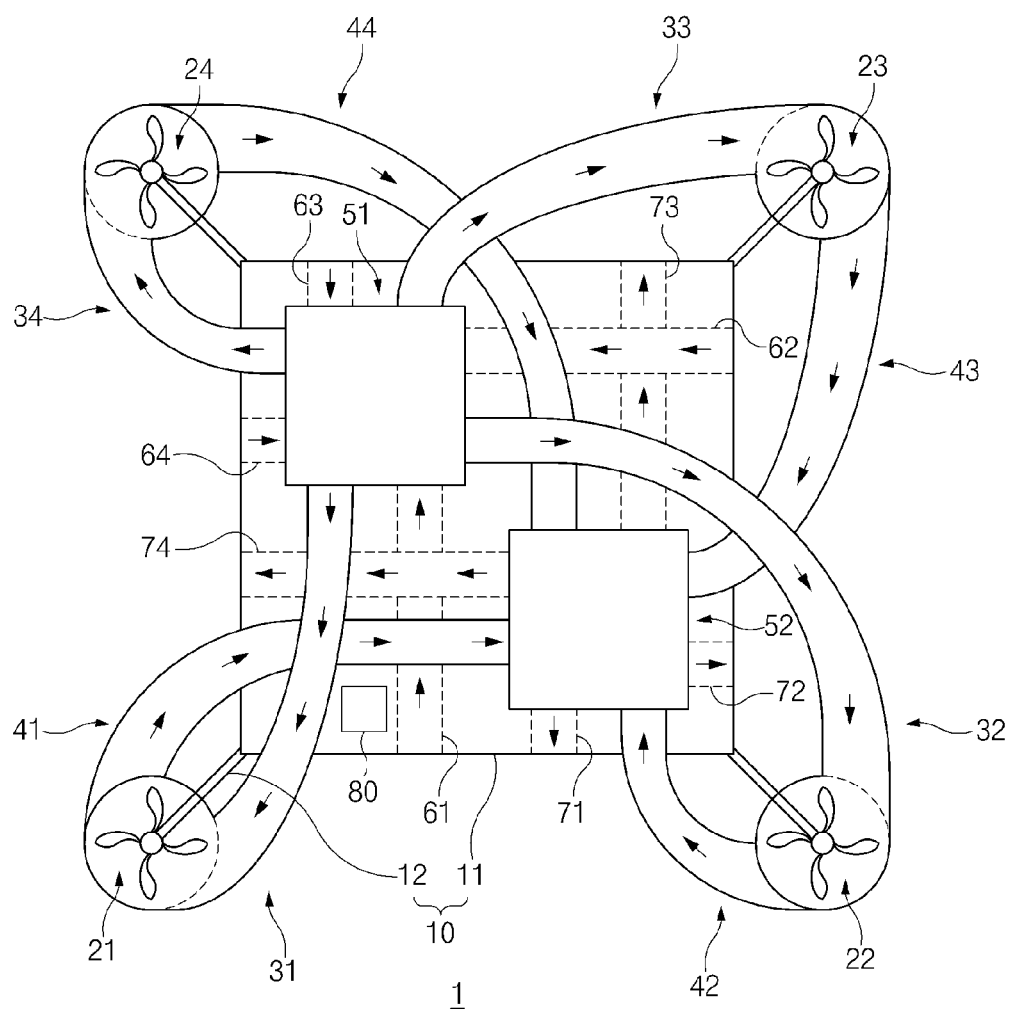
FIG. 4 is a concept view showing the movable device according to the embodiment of the present disclosure.
Figure 5:
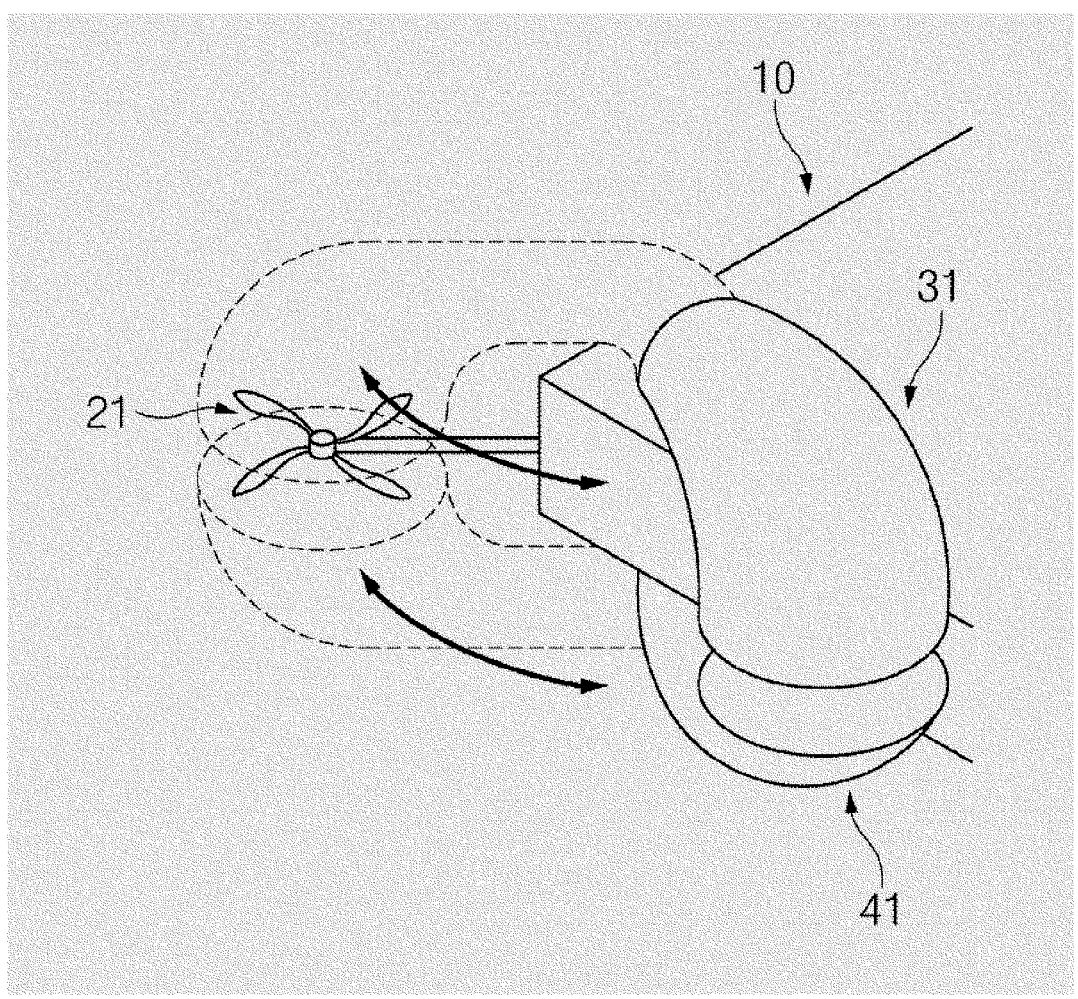
FIG. 5 is a detailed view showing a portion of the movable device according to the embodiment of the present disclosure.

FIG. 1 is a lower surface perspective view showing a movable device 1 according to an embodiment of the present disclosure. FIG. 2 is a front view showing the movable device 1 according to the embodiment of the present disclosure. FIG. 3 is a perspective view showing the movable device 1 according to the embodiment of the present disclosure. FIG. 4 is a concept view showing the movable device 1 according to the embodiment of the present disclosure. FIG. 5 is a detailed view showing a portion of the movable device 1 according to the embodiment of the present disclosure.

Referring to the drawings, the movable device 1 according to the embodiment of the present disclosure includes a movable device body 10, at least one rotor 20 as lift generating unit, and a supply duct 30, and the movable device further includes a suction duct 60, a return duct 40, a discharge duct 70, a controller 80, and a cleaner module 90.

Movable Device Body 10

The movable device body 10 is an element that serves as a frame to which elements of the movable device 1 according to the embodiment of the present disclosure are connected or embedded. The movable device body 10 is shown as a cuboid shape in the drawings for convenience of description, but the shape of the movable device is not limited thereto.

The rotor 20 is rotatably connected to the movable device body 10. The rotor 20 generates lift force while rotating, so the movable device body 10 may fly by the lift force generated by the rotor 20. However, the movable device 1 according to the embodiment of the present disclosure may also be operated in water, so the rotor 20 may be used for moving in the water rather than flying. Movement may include flying and moving in the water, and in the specification of the present disclosure, as a representative example of movement, operation of the movable device 1 during flying will be described.

The supply duct 30 may be connected to an outside surface of the movable device body 10, and the return duct 40 may be connected to the outside surface of the movable device body 10. In detail, the supply duct 30 may be connected to an upper surface 111 of a main body part, and the return duct 40 may be connected to a lower surface 112 of the main body part. Inside the movable device body 10, a first mooring space 51 and a second mooring space 52 are respectively provided, and the suction duct 60 and the discharge duct 70 that are extended from the inside of the movable device 1 to the outside surface of the movable device body 10 may be arranged. According to the embodiment of the present disclosure, the first mooring space 51 and the second mooring space 52 are provided at the inside of the movable device body 10, but a separate mooring space may be provided at the outside thereof. In addition, the movable device body 10 may suction and discharge fluid such that first and second ends of each duct are open outward without a separate mooring space. In the specification of the present disclosure, air is used as the representative example of fluid in describing the operation of the movable device 1.

For example, when the movable device 1 according to the embodiment of the present disclosure is used in water, the first mooring space 51 is used as a ballast tank in which ballast water is stored, so the first mooring space 51 may be used to control submerging or floating of the movable device 1.

The movable device body 10 may include a plurality of rotor connectors 12. The plurality of rotor connectors 12 is connected to the main body part 11 of the movable device body 10. Each of the rotor connectors 12 is extended outward from the main body part 11 as the center, and may be arranged to be spaced apart from each other at equal angles or different angles. In the embodiment of the present disclosure, a quadcopter with four rotors 20 is described as an example, so 4 rotor connectors 12 are connected to the main body part 11 and are configured such that one rotor connector of the four rotor connectors is arranged perpendicular to another adjacent rotor connector 12. However, the number of the rotors 20 is not limited to the embodiment, and the number of the rotor connectors 12 is not also limited thereto and may have the number corresponding to the number of the rotors 20. The rotor 20 may be rotatably coupled to an outer end of the rotor connector 12.

The rotor connectors 12 has a rotor drive part (not shown) for generating rotation force, and may transmit the rotation force to enable the rotor 20 to be rotatable. The rotor drive part is electrically connected to the controller 80, which will be described below, and may receive electricity and a control signal. Therefore, as the controller 80 controls the rotor drive part, rotation of the rotor 20 may be controlled due to the controlled rotor drive part. However, the rotor drive part is arranged at the main body part 11 and the rotor connector 12 may serve to transmit the rotation force of the rotor drive part to the rotor 20. In this case, the rotor 20 and the rotor drive part that are spaced apart from each other may be connected to each other with a belt, etc., but a connecting method is not be limited thereto.

The rotation force of the rotor drive part may be used in an operation that requires the rotation force, such as pulling a rope, in addition to the rotation of the rotor 20. Therefore, only part of the rotation force of the rotor drive part is transmitted to the rotor 20, and the remaining part of the rotation force of the rotor drive part may be used for the above-described purpose.

Rotor 20

The rotor 20 is a rotating blade that is rotated to generate lift force or to push the fluid. The rotor 20 is a type of lift generating unit for generating a pressure difference to generate lift force, and in the embodiment of the present disclosure, the rotor 20 that is a representative example of the lift generating unit is used for describing the lift generating unit, but according to a modification of the present disclosure, a device for generating lift force by using the Coanda effect using flow of jet without an exposed rotating blade may be used as the lift generating unit.

In order to generate an upward lift force, the rotor 20 is rotated to generate a pressure difference between opposite sides of the rotor 20. The opposite sides of the rotor 20 may be upper and lower sides thereof.

The rotor 20 may consist of at least one blade 212 extended in an outward radial direction from a center portion 211 connected to a shaft. In the embodiment of the present disclosure, the rotor 20 is described with a rotor having four blades 212 as an example, but the number of blades 212 one rotor 20 has is not limited thereto.

The rotor 20 is not parallel to a horizontal direction, and may have an angle of attack such that a leading edge that is a leading edge than another edge in the blade 212 on the basis of a rotating direction of the blade is located above a trailing edge that is a following edge. Therefore, when the rotor 20 is rotated in a shaft direction on the shaft passing through the center portion, the lift force is generated.

The rotor 20 may be rotatably coupled to the outer end of the rotor connector 12. However, the rotor 20 may be rotatably coupled directly to the main body part 11.

Furthermore, as described above, the rotor 20 may be rotatably coupled to the rotor connector 12 in a state in which the rotor connector 12 is folded toward the main body part 11.

The rotor 20 may include a plurality of rotors and each of the rotors is operated and is rotated independently. Therefore, a rotating direction and speed of one of the rotors 20 are different from a rotating direction and speed of other rotors, and the difference is generally used to control the posture of the movable device 1. According to the embodiment of the present disclosure, in the movable device 1, looking downward with the movable device body 10 as the center, a first rotor 21, a second rotor 22, a third rotor 23, and a fourth rotor 24 are arranged sequentially in a counter-clockwise direction. Therefore, the first rotor 21 is connected to the main body part 11 by a first rotor connector 121, the second rotor 22, the third rotor 23, and the fourth rotor 24 are respectively connected to the main body part 11 by a second rotor connector 122, a third rotor connector 123, and a fourth rotor connector 124.

A rotor protector (not shown) surrounding an area in which the rotor 20 is rotated may be provided. The rotor protector can prevent a user from suffering injuries due to the rotation of the rotor 20, and the rotor 20 may be prevented from being damaged. The rotor protector may be connected to the supply duct 30 or the return duct 40 to be described below.

Meanwhile, as described above, the lift generating unit is not limited to the rotor, and may be any device for generating a pressure difference between a first space and a second space partitioned with the lift generating unit as the center. For example, instead of the rotor, an impeller or a device that mimics wings of insects or birds may be operated to generate a pressure difference between predetermined spaces partitioned with the lift generating unit as the center between the spaces.

Supply Duct 30 and Suction Duct 60

The supply duct 30 is an element for supplying air to the rotor 20, thereby using a force of the air suctioned by the rotor 20. The supply duct 30 is formed in a hollow tubular body, and a first end thereof is arranged above the rotor 20, and a second end thereof supplies air to the rotor 20 by suctioning air and discharging the air through the first end thereof.

The number of the supply ducts 30 corresponds to the number of the rotors 20. Accordingly, one supply duct 30 may correspond to one rotor 20, and two supply ducts 30 may also correspond to one rotor 20 and one supply duct 30 may correspond to two rotors 20. The supply duct 30 may be connected to the movable device body 10 so as to maintain a location thereof corresponding to the movable device body 10. In the embodiment of the present disclosure, one supply duct 30 is arranged corresponding to one rotor 20. Therefore, a first supply duct 31 is provided to correspond to the first rotor 21, a second supply duct 32 is provided to correspond to the second rotor 22, a third supply duct 33 is provided to correspond to the third rotor 23, and a fourth supply duct 34 is provided to correspond to the fourth rotor 24.

An auxiliary opening 314, which may be connected to the outside to receive air from the outside and to transmit the air to an upper side of the rotor 20, may be provided in the supply duct 30. The auxiliary opening 314 may be provided by penetrating a portion of a supply duct body 313 close to the first end 311 of the supply duct and may include a plurality of auxiliary openings. In the drawing, it is shown that only the first supply duct 31 has the auxiliary opening 314, but the other supply ducts 32 to 34 may have auxiliary openings. In addition, the return duct 40 to be described below may have an auxiliary opening.

The supply duct 30 may include a supply valve (not shown) for controlling flow of the fluid that flows through the supply duct 30.

In addition, the supply duct 30 may have a spiral thread or groove therein to allow the fluid, e.g. air, etc., to be rotated in the supply duct and to generate the rotation force. In addition, a direction of the spiral shape is arranged to be adopted to the rotating direction of the rotor, so that the rotation force of the rotor may not be canceled and may be more powerful. In the present disclosure, all places such as the mooring space, the coupling part, various modules, etc. through which the fluid flows may have spiral threads or grooves to generate the rotation force.

The supply duct 30 may have a flux sensor (not shown) or a pressure sensor (not shown) to obtain a value of volume or pressure of air passing through the supply duct 30. The flux sensor or the pressure sensor transmits the obtained value of volume or pressure to the controller 80 to allow the controller 80 to control opening and closing of the auxiliary opening 314. However, the flux sensor or the pressure sensor may transmit the obtained value as an electrical signal directly to an opening and closing drive part (not shown) without passing through the controller 80 to control opening and closing of the auxiliary opening 314.

Referring to FIG. 5, the supply duct 30 may be movably connected to the movable device body 10. FIG. 5 shows examples of the first supply duct 31 and a first return duct 41. In the embodiment of the present disclosure, the second end 312 of the supply duct is rotatably connected to the movable device body 10. Therefore, when the supply duct 30 is rotated, the supply duct body 313 is rotated around the second end 312 of the supply duct, so that the first end 311 of the supply duct may be deviated from the upper side of the rotor 20 or be located at the upper side of the rotor 20 selectively. In order to locate the first end 311 of the supply duct at the upper side of the rotor 20, the second end 312 of the supply duct may be connected to the upper surface 111 of the main body part. Various movement methods, such as extension or contraction, may also move the supply duct 30 from the movable device body 10 in addition to the rotation.

The supply duct 30 may be moved by a supply duct drive part (not shown). In the embodiment of the present disclosure, the supply duct 30 may be rotate while the supply duct drive part is arranged in the movable device body 10 and connected to the second end 312 of the supply duct. The supply duct drive part may receive the power and the control signal from the controller 80 by being electrically connected to the controller 80. The supply duct drive part is operated in response to the control signal to allow the supply duct 30 to be located at or deviated from the upper side of the rotor 20 so that the posture of the movable device 1 may be controlled. A detailed control method will be described in descriptions for FIGS. 7 to 9.

The suction duct 60 is an element receiving air from the outside, is formed in a hollow tubular body similar to the shape of the supply duct 30, and has a first end that is open outward to suction outside air and a second end that supplies the outside air to the supply duct 30. The suction duct 60 may also be connected to the movable device body 10.

The second end 312 of the supply duct is connected to the suction duct 60 and may suction the outside air through the suction duct 60. Specifically, the second end 312 of the supply duct may penetrate the movable device body 10 and be connected to the suction duct 60 in the movable device body 10. Therefore, the outside air suctioned by the suction duct 60 is supplied to the supply duct 30 and the supply duct 30 may supply the supplied outside air to the rotor 20. The second end of the suction duct 60 is connected to the second end 312 of the supply duct 30 in the movable device body 10, and the first end of the suction duct 60 may pass through the movable device body 10 to be open outward in order to suction the outside air.

The supply duct 30 and the suction duct 60 may be connected to each other via the first mooring space 51. However, the supply duct 30 and the suction duct 60 may be connected directly to each other without passing through the first mooring space 51. The second end 312 of the supply duct communicates with the first mooring space 51 located in the movable device body 10 and the second end of the suction duct 60 also communicates with the first mooring space 51, whereby the supply duct 30 and the suction duct 60 may be connected to each other indirectly. The outside air suctioned by the suction duct 60 is supplied to the first mooring space 51 and the air supplied to the first mooring space 51 is suctioned by the supply duct 30, thereby circulating air in a method of discharging air from the upper side of the rotor 20 toward the rotor 20. For the air circulation, the rotor 20 is rotated, relative low pressure is generated at the upper side of the rotor 20 by the rotation of the rotor 20, and the generated low pressure allows the outside air to be suctioned through the first end of the suction duct 60 and to be supplied to an upper side of the supply duct 30.

The suction duct 60 may include a plurality of suction ducts. A plurality of the suction ducts 60 may be arranged on a plurality of side surfaces 113 included in the movable device body 10. On the plurality of side surfaces 113, the suction ducts 60 may be uniformly arranged at predetermined distances. In addition, according to a modification of the embodiment of the present disclosure, the suction duct 60 may be arranged on the upper surface 111 or the lower surface 112 of the main body part to affect rising and lowering of the movable device 1. When the movable device 1 rises, one of the suction ducts located on the upper surface 111 suctions air and reaction force thereof assists rising of the movable device 1.

In the embodiment of the present disclosure, four suction ducts 60 are respectively arranged at four side surfaces of the main body part 11 while being open in a direction in which each side surface faces, and suction ducts 60 adjacent to each other are arranged perpendicular to each other, but the number and arrangement method of the suction ducts are not limited to the embodiment. Therefore, in the state with the four side surfaces of the main body part 11, sixteen suction ducts 60 may be arranged such that four suction ducts are provided at each side surface. Looking downward with the movable device body 10 as the center, a first suction duct 61, a second suction duct 62, a third the suction duct 63, and a fourth suction duct 64 are arranged in order in the counterclockwise direction from a location between the first rotor 21 and the second rotor 22.

The suction duct 60 may be used to control the posture of the movable device body 10. A suction valve (not shown) for controlling flow of air flowing through the suction duct 60 may be arranged the suction duct 60. The suction valve is closed so that the outside air may be suctioned through one of suction ducts 60 that is arranged on a side surface of the main body part 11 facing in a direction to be moved (desired direction) and may not be suctioned through the remaining suction ducts 60. Whereby the movable device body 10 may be moved in the desired direction by a reaction force of suction force of the opened suction duct 60. When the suction duct 60 suctions air in the desired direction, an air resistance reduction effect may be generated. The suction valve may be electrically connected to the controller 80, receive electricity by the controller 80, and receive the control signal from the controller 80. Therefore, the controller 80 may control a degree of opening of each suction valve. A detailed control method will be described in descriptions for FIGS. 7 to 9.

According to a modification of the embodiment of the present disclosure, the movable device body 10 may have a fixed blade (now shown) that may be exposed outward or hidden into the movable device body 10. The fixed blade is arranged such that a rear end thereof is located close to the suction duct 60 when the fixed blade is unfolded and exposed outward. Therefore, the suction duct 60 allows the flow of air to flow front a front end of the fixed blade to the rear end thereof, and thus lift force may be generated at the fixed blade.

According to a modification of the present disclosure, the supply duct may be provided suitable for placing freight. Therefore, the supply duct may have a shape extending upward and outward from the movable device body as the supply duct goes from the first end discharging air to the second end suctioning air. When the freight is placed on the supply duct, the second end of the supply duct may be brought into contact with the freight at the outside of the freight. Therefore, the freight may be prevented from being separated from the movable device body. In addition, a middle portion of the supply duct may be formed flat to efficiently place the freight thereon. With the supply duct having the above structure, the freight may be transported using the movable device of the present disclosure.

Return Duct 40 and Discharge Duct 70

The return duct 40 is an element using a force of air discharged from the rotor 20 by guiding the air discharged from the rotor 20 in one direction. The return duct 40 is formed in a hollow tubular body, and has a first end arranged at the lower side of the rotor 20 and a second guiding the air discharged from the rotor 20 in one direction.

The return duct 40 may have the number of which corresponding to the number of the rotors 20. Therefore, one return duct 40 may be provided to correspond to each of the rotors 20, and two return ducts 40 may be provided to correspond to one rotor 20 or one return duct 40 may be provided to correspond to two rotors 20. The return duct 40 is connected to the movable device body 10 to maintain a position thereof relative to the movable device body 10. In the embodiment of the present disclosure, the return duct 40 is arranged such that one return duct 40 corresponds each of the rotors 20. Therefore, the first return duct 41 is provided to correspond to the first rotor 21, a second return duct 42 is provided to correspond to the second rotor 22, a third return duct 43 is provided to correspond to the third rotor 23, and a fourth return duct is provided to correspond to the fourth rotor 24.

The return duct 40 may have a discharge opening (not shown) similar to the auxiliary opening 314 of the supply duct 30, and the discharge opening is connected to the outside and may discharge air to the outside.

In addition, the return duct 40 may have a return valve (not shown) that controls a flow of the fluid flowing through the return duct 40.

In addition, like the supply duct 30, a spiral thread or groove may be provided in the suction duct 60 whereby fluid, such as air, may be rotated in the duct to generate rotation force. In addition, a direction of the spiral is arranged to be adopted to the rotating direction of the rotor, so that the rotation force of the rotor may not be canceled and may be stronger. In the present disclosure, all places such as the mooring space, the coupling part, various modules, etc. through which the fluid flows may have a spiral thread or groove to generate the rotation force.

Referring to FIG. 5, the return duct 40 may be movably connected to the movable device body 10. In the embodiment of the present disclosure, a second end 412 of the return duct is rotatably connected to the movable device body 10. Therefore, when the return duct 40 is rotated, the return duct body 413 is rotated around the second end 412 of the return duct, and a first end 411 of the return duct may be deviated from the lower side of the rotor 20 or be located at the lower side of the rotor 20 selectively. In order to locate the first end 411 of the return duct at the lower side of the rotor 20, the second end 412 of the return duct may be connected to the lower surface 112 of the main body part. A linear movement method may also move the return duct 40 from the movable device body 10 in addition to the rotation.

The return duct 40 may be moved by a return duct drive part (not shown). In the embodiment of the present disclosure, the return duct drive part is arranged in the movable device body 10 to be connected to the second end 412 of the return duct to rotate the return duct 40. The return duct drive part is electrically connected to the controller 80 to receive electricity and the control signal from the controller 80. The return duct drive part is operated in response to the control signal to allow the return duct 40 to be located at or deviated from the lower side of the rotor 20, and thus the posture of the movable device 1 may be controlled. A detailed control method will be described in descriptions for FIGS. 7 to 9.

As described above, the return duct 40 is formed similar to the formation of the supply duct 30, and may be an element that is arranged symmetrically around the movable device body 10 to introduce air from the outside of the movable device body 10 to the inside thereof.

The discharge duct 70 is an element discharging air to the outside, is formed in a hollow tubular body similar to the return duct 40, and has a first end that is open outward and a second end that receives air from the return duct 40. The discharge duct 70 is also connected to the movable device body 10.

The second end 412 of the return duct is connected to the discharge duct 70 and discharges the air to the outside through the discharge duct 70. The air guided by the return duct 40 is discharged to the outside by the discharge duct 70. Specifically, the second end 412 of the return duct may penetrate the movable device body 10 and be connected to the discharge duct 70 in the movable device body 10. Therefore, the outside air suctioned by the return duct 40 may be supplied to the discharge duct 70 and the discharge duct 70 may discharge the supplied air to the outside again. The second end of the discharge duct 70 is connected to the second end of the return duct 40 in the movable device body 10, and the first end of the discharge duct 70 may be open outward while penetrating the movable device body 10 in order to discharge the air outward.

The return duct 40 and the discharge duct 70 may be connected to each other by the second mooring space 52. However, the return duct 40 and the discharge duct 70 may be connected directly to each other without passing through the movable device body 10. The second end 412 of the return duct communicates with the second mooring space 52 provided in the movable device body 10 and a the second end of the discharge duct 70 also communicates with the second mooring space 52, so that the return duct 40 and the discharge duct 70 are connected to each other indirectly. Air circulation may be performed such that the return duct 40 suctions air supplied from the rotor 20 and the air is supplied to the second mooring space 52, and the air supplied to the second mooring space 52 is suctioned by the discharge duct 70 and discharged to the outside. In order to perform the air circulation, the rotor 20 is rotated, a relative high pressure is generated at the lower side of the rotor 20 by the rotation of the rotor 20 and air is pushed downward to generate lift force, and the pushed air is introduced into the first end 411 of the return duct and is discharged through the first end of the discharge duct 70.

The second mooring space 52 is formed similar to the first mooring space 51, and may be formed to be distinguished from the first mooring space 51 in the movable device body 10. However, the first mooring space 51 and the second mooring space 52 may be connected to each other.

The discharge duct 70 may include a plurality of discharge ducts. The plurality of discharge duct 70 may be arranged on the plurality of side surfaces 113 included in the movable device body 10. On the plurality of side surfaces 113, the suction ducts 60 may be uniformly arranged at predetermined distances. In addition, the discharge duct 70 may also be arranged on the upper surface 111 or the lower surface 112 of the main body part to affect rising and lowering of the movable device 1. When the movable device 1 rises, the discharge duct located on the lower surface 112 discharges air and reaction force thereof assists rising of the movable device 1.

In the embodiment of the present disclosure, four discharge ducts 70 are respectively arranged the four side surfaces of the main body part 11 while being open in the direction in which each side surface faces, and adjacent discharge ducts of the four discharge ducts 70 are arranged perpendicular to each other, but the number and arrangement method of the discharge ducts are not limited to the embodiment. Looking downward with the movable device body 10 as the center, a first discharge duct 71, a second discharge duct 72, a third discharge duct 73, and a fourth discharge duct 74 are arranged in order in the counterclockwise direction from an opening between the first rotor 21 and the second rotor 22.

The discharge duct 70 may be used to control the posture of the movable device body 10. A discharge valve (not shown) for controlling a flow of air flowing through the discharge duct 70 may be arranged in the discharge duct 70. One of a plurality of discharge valves is controlled to discharge the outside air to the outside through one of the discharge ducts 70 that is arranged on a side surface of the main body part 11 facing in a direction opposite to the desired direction, and not to be discharged the outside air through the remaining discharge ducts 70. Therefore the movable device body 10 may be moved in the desired direction by reaction force of discharge force of the opened discharge duct 70. The discharge valve is electrically connected to the controller 80 to receive electricity and the control signal from the controller 80. Therefore, the controller 80 may control a degree of opening of each discharge valve. A detailed control method will be described in descriptions for FIGS. 7 to 9.

The supply duct 30 and the return duct 40 are respectively located at the upper and lower sides of the rotor 20, and the supply duct 30 may cover a side surface of the rotor 20 or and the return duct 40 may cover the side surface of the rotor 20 so as to protect the user from the rotation of the rotor 20. The supply duct 30 and the return duct 40 are located at the upper and lower sides of the rotor 20 so that the noise generated due to the rotation of the rotor 20 may be reduced. A sound absorbing member for absorbing sound waves, a heat absorbing member for absorbing heat, and a shielding member for shielding electromagnetic waves may be arranged in the supply duct 30 and the return duct 40.

The rotation detecting part (now shown) including a rotatable propeller, generator, or encoder may be arranged between the suction duct 60 and the supply duct 30 or between the return duct 40 and the discharge duct 70. The propeller is rotated by air while the air passes through the rotation detecting part, the generator may generate electricity by the rotation of the propeller, and rotation speed of the propeller may be obtained by the encoder. Amount and flow rate of the air flowing may be inferred from the rotation speed, so that the controller 80 to be described below is electrically connected to the rotation detecting part to receive the rotation speed obtained and electricity generated.

According to another modification of the present disclosure, the return duct may be used to transport freight. The return duct is extended to face the lower side of the rotor and the outside of the movable device body as the return duct goes from the first end thereof to the second thereof, so freight may be placed in spaces between the return ducts and be held by the return ducts. In order to assist freight transportation, the return duct or the movable device body may have a holding part for holding freight with pressure.

Controller 80

The controller 80 generates the control signal controlling the posture of the movable device body and transmits the control signal to each element. The controller may include a microprocessor, such as a central processing unit (CPU), a field programmable gate array (FPGA), an application specific integrated circuit (ASIC), etc., which are capable of logical operations, and capable of generating control signals and receiving electrical signals.

The controller 80 controls the posture of the movable device body by controlling a location of the supply duct 30 corresponding to each rotor 20. The controller 80 may control the posture of the movable device body by controlling a location of the return duct 40 similar to controlling the location of the supply duct 30. As described above, the controller 80 may control the posture and speed of the movable device body by controlling the suction valve and the discharge valve respectively controlling a degree of opening of the suction duct 60 and a degree of opening of the discharge duct 70. A detailed control method will be described in description of FIGS. 7 to 9.

The controller 80 may be located in the body of the movable device 1, and may be electrically connected to the supply duct drive part for moving the supply duct 30 and to the rotor drive part for driving the rotor 20. The controller 80 may be electrically connected to the return duct drive part, the suction valve, and the discharge valve. The controller 80 may include a power source, such as a battery, and may transmit the control signal and electricity generated to each element.

Furthermore, according to the embodiment of the present disclosure, the movable device 1 may include an image capture device, such as a camera, for capturing an image of the outside of the movable device, an optical sensor for detecting an object, a pressure sensor for measuring atmospheric pressure around the movable device, and a temperature sensor for measuring the temperature around the movable device. Each of the elements may be electrically connected to the controller 80 to transmit a sensing signal obtained to the controller 80, or to receive the control signal or electricity from the controller 80. However, a type of sensor that the movable device 1 may include is not limited to the embodiment.

The controller 80 may receive a command signal for controlling the movable device 1 from an operating device operated by the user and transmit a signal to the operating device. Therefore, the controller 80 may include a wireless modem to enable wireless communication with the operating device.

When the cleaner module (reference numeral 90 in FIG. 6) or other modules are connected to the movable device 1, the controller 80 is electrically connected to each of the modules and transmits the control signal to each of the connected modules to control each of the modules.

Second Embodiment

Cleaner Module 90

Figure 6:
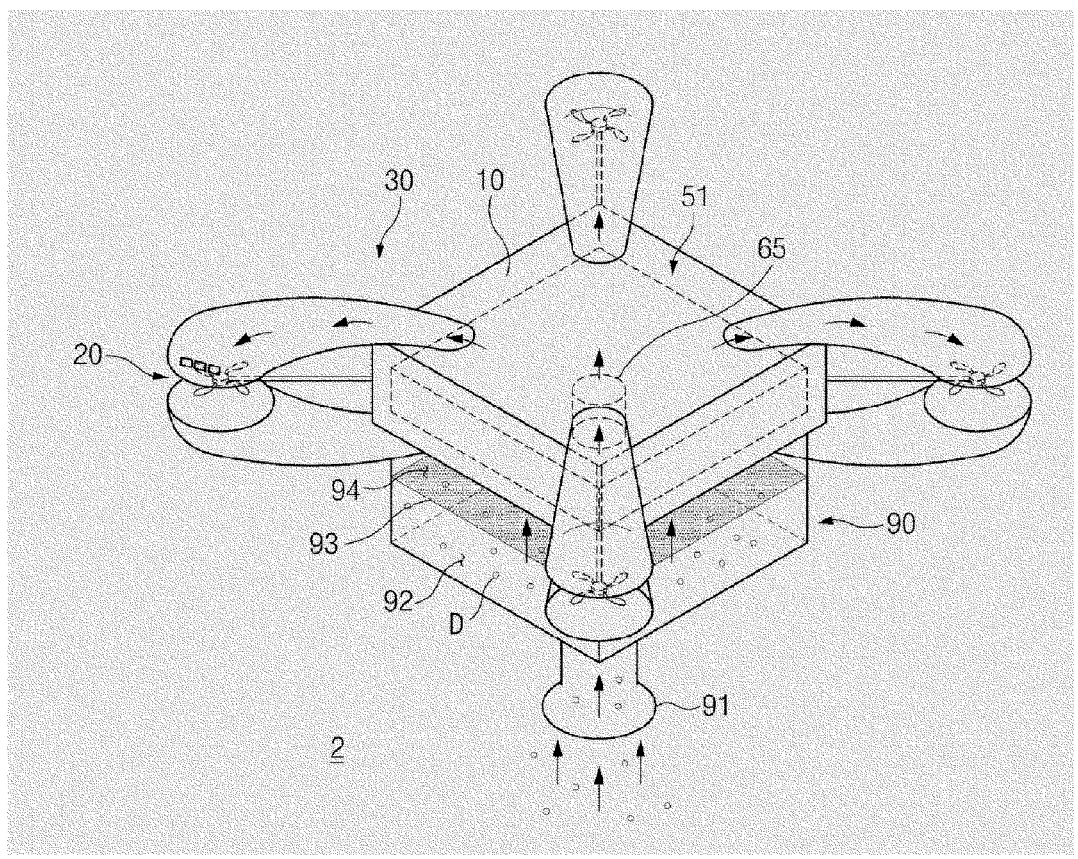
FIG. 6 is a perspective view showing a movable device to which a cleaner module is coupled according to a second embodiment of the present disclosure.

FIG. 6 is a perspective view showing a movable device 2 to which the cleaner module 90 is coupled according to a second embodiment of the present disclosure.

In FIG. 6, the movable device 2 is described without showing a second mooring space and the discharge duct for convenience of description. However, omitted elements may exist in the second embodiment in FIG. 6.

According to the second embodiment of the present disclosure, the movable device 2 may include the cleaner module 90. The cleaner module 90 is connected to a suction duct 65 included in the movable device 2.

The cleaner module 90 is a device suctioning the debris (D) by using suction force of the movable device 2, and may include a suction member 91, a filter portion 93, and a discharge portion 94, and may include a debris collecting portion 92 and a debris dividing part (not shown).

The suction member 91 is an element suctioning the outside air and the debris (D) together, and is a portion corresponding to a head of a cleaner. Therefore, when the rotor 20 is rotated, the suction member 91 receives the suction force generated from the rotor 20 and suctions the outside air and the debris (D) together. In order to prevent the debris (D) from being discharged to the outside through the suction member 91 after the suction force is removed, the suction member 91 may include a partition (not shown) that is extended in a direction in which the debris (D) is suctioned from the outside and is extended from an inner surface of the suction member in an inward radial direction.

The outside air and the debris (D) suctioned through the suction member 91 reach the debris collecting portion 92 that is a space located in the cleaner module 90. The debris collecting portion 92 is divided from the discharge portion 94 by the filter portion 93, and the filter portion 93 is an element provided to allow the outside air to pass through the debris collecting portion 92 to the discharge portion 94, but not to allow the debris (D) to pass through the debris collecting portion. Therefore, the filter portion 93 may be made of a porous film through which gas pass but the debris (D) or dust may not pass. The debris (D) filtered by the filter portion 93 is collected in the debris collecting portion 92.

The debris dividing part separates the debris from gas before the filter portion. Then, the separated debris is delivered to the debris collecting portion and the gas is delivered to the filter portion. As an example, like the conventional invention of Dyson (registered trademark)'s Cyclone (product name), it is possible to separate debris by a centrifugal force by applying rotation to suction mixture.

Air passes through the filter portion 93 and reaches the discharge portion 94. The discharge portion 94 is connected to the suction duct 60, and delivers the air to the suction duct 65 to be supplied to the upper side of the rotor 20 through the first mooring space 51 and the supply duct 30. The filter portion 93 consists of a high efficiency particulate air (HEPA) filter, etc., so as to collect and discharge fine dust from the suctioned air and discharge, thereby performing an air cleaning function. However, in a modification without the first mooring space 51, the suction duct 65 is connected directly to the supply duct 30 and supplies the suctioned air to the rotor 20.

By the rotation of the rotor 20, the air located at the supply duct 30 is moved toward the rotor 20 and is discharged though the first end 311 of the supply duct, whereby flow of air in which air located at the first mooring space 51 and the suction duct 65 is moved to the supply duct 30 is generate to generate the suction force. The suction duct 65 suctions the outside air through the discharge portion 94, the debris collecting portion 92, and the suction member 91 of the cleaner module 90. In the process, when the debris (D) is suctioned together with the air, and is collected to the debris collecting portion 92, cleaning is performed.

According to a modification of the second embodiment of the present disclosure, the movable device may have a handle (not shown), and the movable device may be used in a method of using a general cleaner. The lift force is generated by the rotation of the rotor, so a force smaller than a force required for operating the general cleaner may be required for performing cleaning by operating the movable device according to the modification of the second embodiment.

In the description of the movable device 2 according to the second embodiment of the present disclosure, contents about other elements excluding the contents described are equal to the contents in the movable device 1 according to the embodiment of the present disclosure, so description thereof will be substituted by the description of the movable device 1.

According to the second embodiment of the present disclosure, only the case where the movable device 2 includes the cleaner module 90 is described, but various modules usable the suction force generated by the rotation of the rotor may be included in the movable device 2. In addition to the suction force, the movable device may include a launcher module (not shown) suitable for launching an object, such as a ball, by using the pressure of the air discharged through the discharge duct 70.

The launcher module may use the pressure of the air discharged through the discharge duct, but may perform air jet in a manner of storing the air suctioned by using the suction duct to in one mooring space, and then sealing an opening of the mooring space and opening the sealed opening when the air jet is required.

Moreover, the cleaner module 90 may be coupled to a body of the movable device by the coupling part to be described below. The coupling part will be described in detail in a latter part of the specification. The cleaner module may include various sensors, which may sense information about a distance or an area between the suction member and an object to be suctioned (e.g. dust), at predetermined positions in the cleaner module.

Control of Movable Device 1

Figure 7:
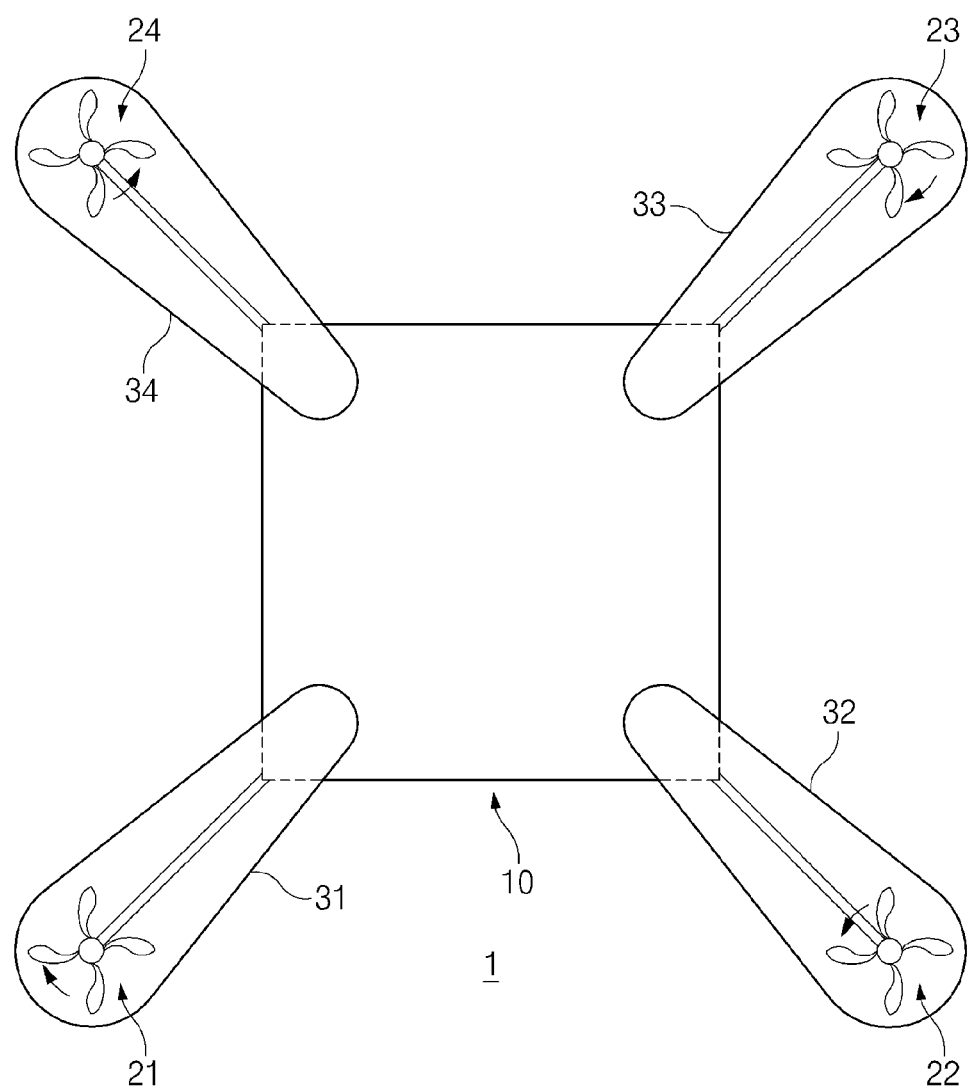
FIG. 7 is a plan view showing the movable device according to the embodiment of the present disclosure.

FIG. 7 is a plan view showing the movable device 1 according to the embodiment of the present disclosure.

According to the embodiment of the present disclosure, the movable device 1 may fly by lift force generated by rotating the rotor 20. The controller 80 may perform rotating the rotor 20 and controlling a rotating direction and a rotation speed of the rotor 20. In a situation of FIG. 7, when the adjacent rotors 20 are rotated in opposite directions at the same rotation speed, the movable device 1 may perform floating in the air and moving in a vertical direction or hovering. In FIG. 7, all the supply ducts 30 are respectively located above the corresponding rotors 20, but in order to allow the movable device 1 to perform the operation of floating in the air and moving in the vertical direction, all the supply ducts 30 may be in a state in which the supply ducts are deviated from the upper side of the corresponding rotors 20.

Among the plurality of supply ducts 30, at least one supply duct 30 is rotated to deviate from the upper side of one corresponding rotor 20, whereby the posture of the movable device 1 may be controlled without controlling the rotation speed of the rotor 20.

Figure 8:
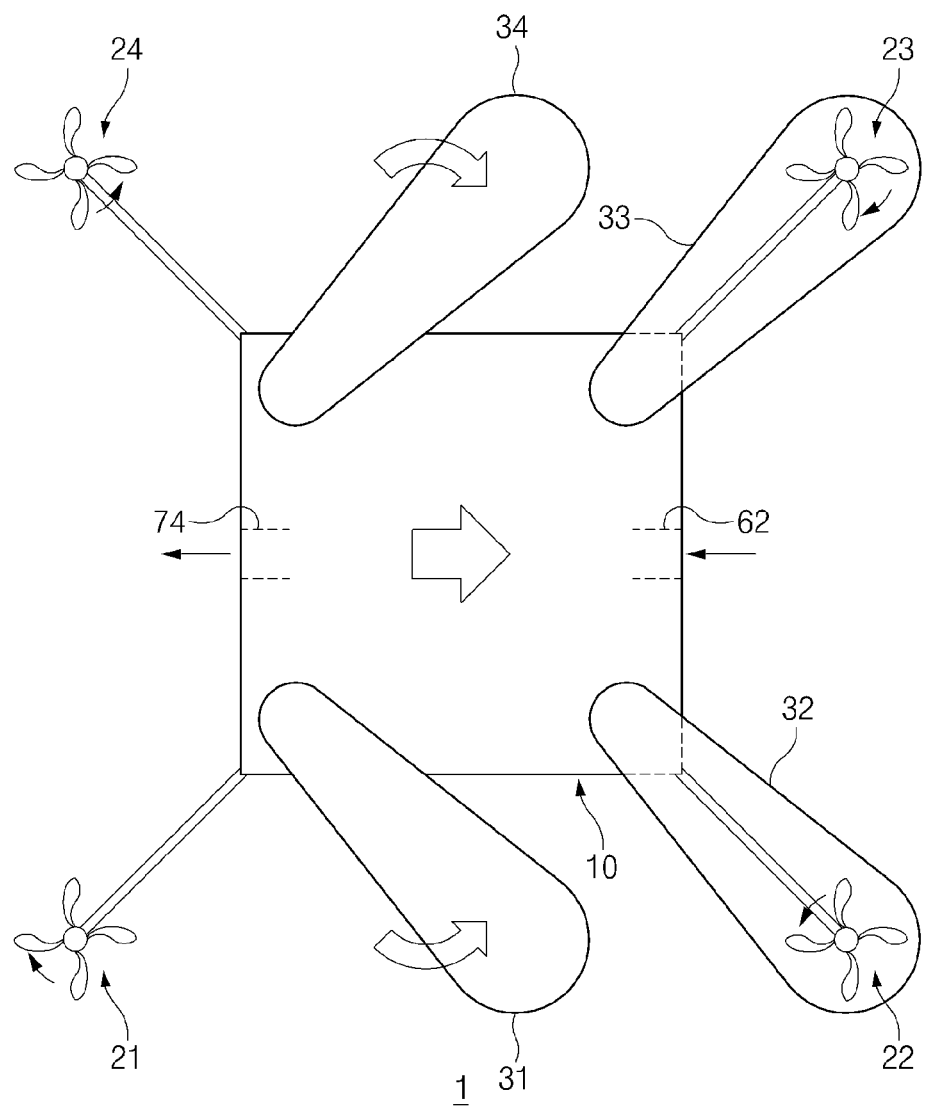
FIG. 8 is a plan view showing the movable device according to the embodiment of the present disclosure, the movable device flying in one direction.

FIG. 8 is a plan view showing the movable device 1 according to the embodiment of the present disclosure, the movable device 1 flying in one direction.

Referring to FIG. 8, several supply ducts adjacent to each other among the plurality of supply ducts 30 are rotated, whereby the several supply ducts 30 may be deviated from the upper sides of the rotors 20 corresponding to the several the supply ducts 30. When the several supply ducts 30 are deviated from the upper sides of the rotors 20, without controlling the rotation speed of the rotors 20, lift forces generated by the rotors 20 corresponding to the several supply ducts 30 is increased. As shown in FIG. 8, the first supply duct 31 and the fourth supply duct 34 adjacent to each other are rotated to be deviated from the upper sides of the first rotor 21 and the fourth rotor 24, and the second supply duct 32 and the third supply duct 33 are located at the upper sides of the second rotor 22 and the third rotor 23. Therefore, lift forces generated by the first rotor 21 and the fourth rotor 24 are increased, the movable device 1 is moved in a direction of the virtual arrow shown at the movable device body 10 in FIG. 8. The movable device 1 is moved in a direction in which the second rotor 22 and the third rotor 23 look together, and is moved in a direction opposed to a direction in which one side of the movable device body 10 where the supply ducts 30 deviated from the upper sides of the rotors 20 are coupled.

In order to move in the direction indicated by the virtual arrow of the movable device body 10 in FIG. 8, the movable device 1 according to the embodiment of the present disclosure may suction the outside air by using only one of the suction ducts 60, which is arranged on a side surface of the movable device body 10 facing the desired direction, and the movable device 1 may discharge air to the outside by using only one of the discharge ducts 70, which is arranged on a side surface of the movable device body 10 facing the direction opposite to the desired direction. In FIG. 8, the suction duct and the discharge duct are the second suction duct 62 and the fourth discharge duct 74. For controlling as described above, the controller 80 may control the suction valve and the discharge valve to adjust the degrees of opening of the suction duct 60 and the discharge duct 70. The reaction force generated when the suction duct 60 suctions air and the discharge duct 70 discharges air is an external force acting on the movable device body 10 in the direction where the movable device body 10 wants to be moved. Therefore, the movable device body 10 is efficiently moved in the desired direction.

Based on FIG. 8, only the second suction duct 62 and the fourth discharge duct 74 are opened and the remaining suction ducts and the remaining discharge ducts are closed, so that the outside air may be suctioned through only the second suction duct 62 and the air inside the movable device may be discharged through only the fourth discharge duct 74. A direction in which the second suction duct 62 faces is the desired direction of the movable device 1, and a direction in which the fourth discharge duct 74 faces is opposite to the desired direction of the movable device 1, so that reaction forces of forces applied to the movable device 1 by the suctioned air and the discharged air are applied to the movable device body 10 to allow the movable device to be efficiently moved in the desired direction.

In order to increase the lift forces generated by the first rotor 21 and the fourth rotor 24, a method of opening of auxiliary openings provided at the first supply duct 31 and the fourth supply duct 34.

FIG. 8 illustrates that several supply ducts 30 are moved from the situation in which each of the supply ducts 30 is located at the upper side of the rotor 20 corresponding to the supply duct as shown in FIG. 7 to increase lift force of the corresponding rotors 20. However, to the contrary, when each of the supply ducts 30 is deviated from the upper side of the corresponding rotor 20 and several supply ducts 30 on the opposite side of the several supply ducts 30 are moved to be located at upper sides of the corresponding rotors 20 thereby decreasing lift forces of the corresponding rotors 20, the same effect as FIG. 8 may be provided. In order to realize the control, while all the auxiliary openings are opened, control may be performed to close only auxiliary openings of the second supply duct 32 and the third supply duct 33 that correspond to the second rotor 22 and the third rotor 23, and while all the return ducts 40 are spaced apart from the rotors 20, control may be performed to arrange only the second return duct 42 and the third return duct 43 corresponding to the second rotor 22 and the third rotor 23 close to the corresponding rotors.

Figure 9:
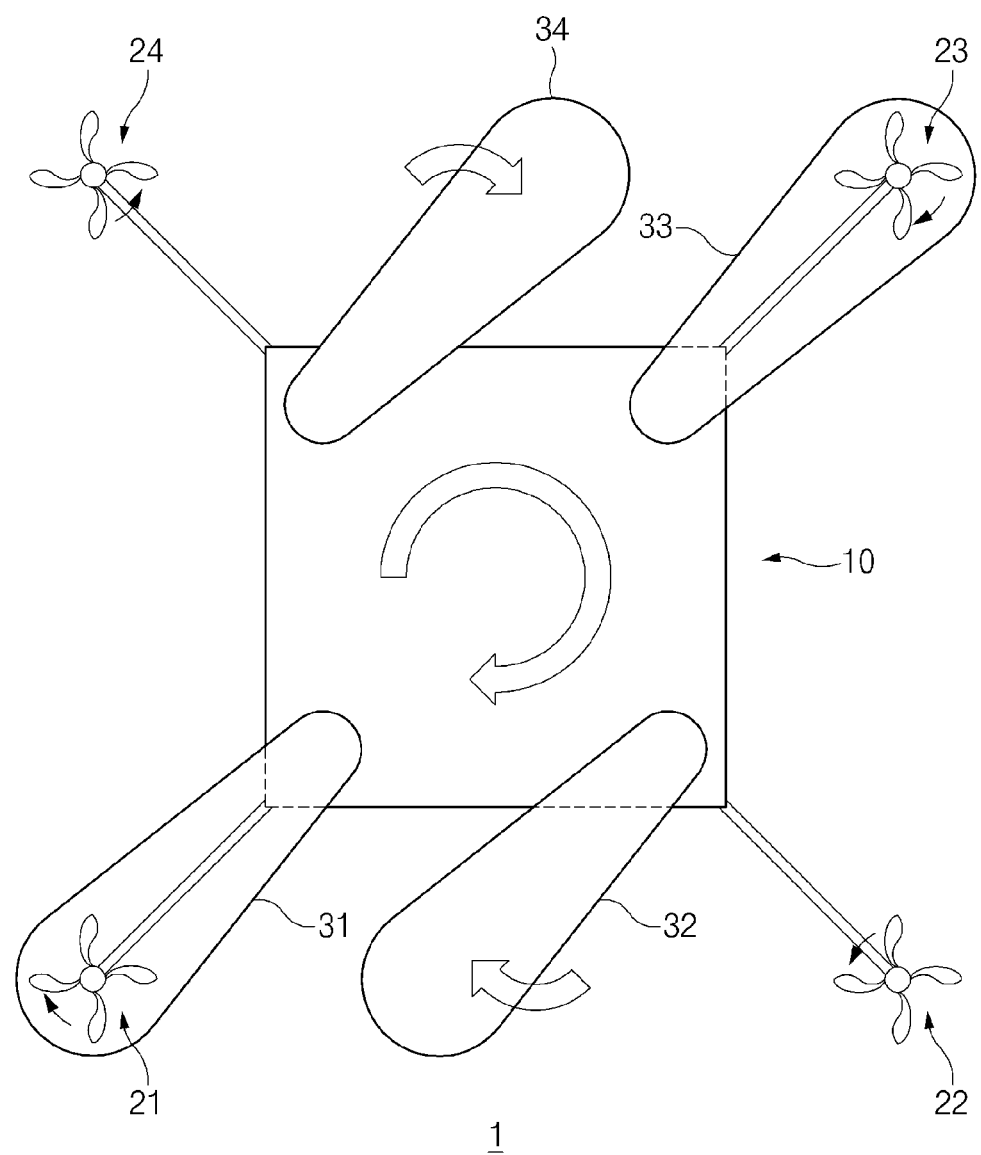
FIG. 9 is a plan view showing the movable device according to the embodiment of the present disclosure, the movable device being rotated in another direction.

FIG. 9 is a plan view showing the movable device 1 according to the embodiment of the present disclosure, the movable device being rotating in another direction.

Referring to FIG. 9, among the plurality of supply ducts 30, supply ducts 30 coupled to the movable device body 10 at opposite locations based on the movable device body 10 may be rotated from the situation in FIG. 7. Whereby, the movable device 1 may be rotated in one direction. In FIG. 9, it is shown that the second supply duct 32 and the fourth supply duct 34 that face each other with the movable device body 10 as the center are rotated to be deviated from the upper sides of the second rotor 22 and the fourth rotor 24, whereby lift forces of the second rotor and the fourth rotor 24 may be increased without increasing the rotation speed and the movable device 1 may be rotated in a clockwise direction equal to the arrow indicated on the movable device body 10. Contrary to the above situation, when the first supply duct 31 and the third supply duct 33 are deviated from upper sides of the first rotor 21 and the third rotor 33 corresponding to the supply ducts 31 and 33, the movable device 1 may be rotated counterclockwise. In detail, when counterclockwise rotation forces of equal magnitude are applied to the second rotor 22 and the fourth rotor 24, the reaction force of the rotors 22 and 24 allows the movable device 1 to be moved clockwise, so that the movable device 1 may perform yaw axial rotation in place. The same logic may be applied to the first rotor 21 and the third rotor 23, so that the movable device may be rotated counterclockwise.

In FIG. 9, in a situation where the supply ducts 30 are located at the upper sides of the respective rotors 20 as shown in FIG. 7, it is shown that several supply ducts 30 are moved to cause increasing lift forces of respective rotors 20. However, in contrary, when each of the supply ducts 30 is deviated from the upper side of the corresponding rotor 20 and several supply ducts 30 on the opposite side of the several supply ducts 30 are moved to be located at upper sides of the corresponding rotors 20, thereby decreasing lift forces of the corresponding rotors 20, the same effect as FIG. 8 may be provided.

Equal to moving the supply duct 30 in FIGS. 8 and 9, the return duct 40 is deviated from or arranged at the lower side of the rotor 20 corresponding to the return duct 40, so that the same effect of increasing or decreasing lift force may be provided. As in FIG. 9, when the lift force is adjusted for rotating the movable device 1, the method used in the description about FIG. 8 may be applied to the supply duct 30, the return duct 40, the supply valve of the supply duct, and the auxiliary opening or the return valve of the return duct equal to FIG. 8.

Third Embodiment

Figure 10:
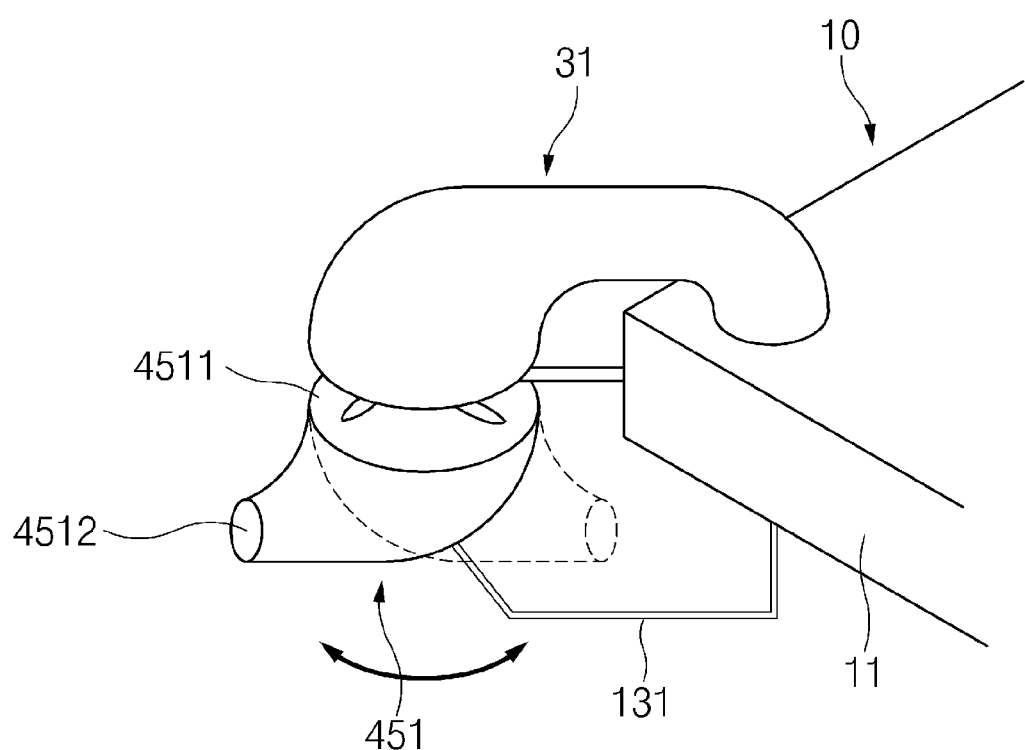
FIG. 10 is a detailed view showing a movable device according to a modification of a third embodiment of the present disclosure.

FIG. 10 is a detailed view showing a movable device 3 according to a third embodiment of the present disclosure.

According to the third embodiment of the present disclosure, a return duct 451 may be rotatably connected to the movable device body 10. The return duct 451 may be connected to the main body part 11 indirectly through a return connection portion 131 included in the movable device body 10. According to the third embodiment of the present disclosure, the movable device 3 may not have the second mooring space and the discharge duct. When the second mooring space is provided in the movable device, a separate connection member (not shown) is used to connect a second end 4512 of the return duct to the second mooring space so as to supply air pushed out by the rotor to the second mooring space.

In the third embodiment of the present disclosure, the return duct 451 is rotatably connected to the return connection portion 131. Therefore, the posture of the return duct 451 may be controlled by rotating the return duct 451 in order to allow the return duct 451 to guide air in a direction opposite to the desired direction. The return duct 451 is rotated to allow the second end 4512 of the return duct to face in the direction opposite to the desired direction, and then a first end 4511 of the return duct receives the air pushed out by the rotor. The first end 4511 of the return duct discharges the air in the direction opposite to the direction where the movable device 3 wants to be moved, thereby generating the reaction force, so that the movable device 3 may be pushed by the reaction force and be easily moved in the desired direction. The return duct drive part may be arranged in the return connection portion 131 in order to change the posture of the return duct 451.

In order to perform the control for rotating the movable device 3 according to the third embodiment of the present disclosure, a second end of each of the return ducts faces a direction opposite to a direction to be rotated, and return ducts adjacent to each other may be arranged perpendicularly to each other.

Figure 11:
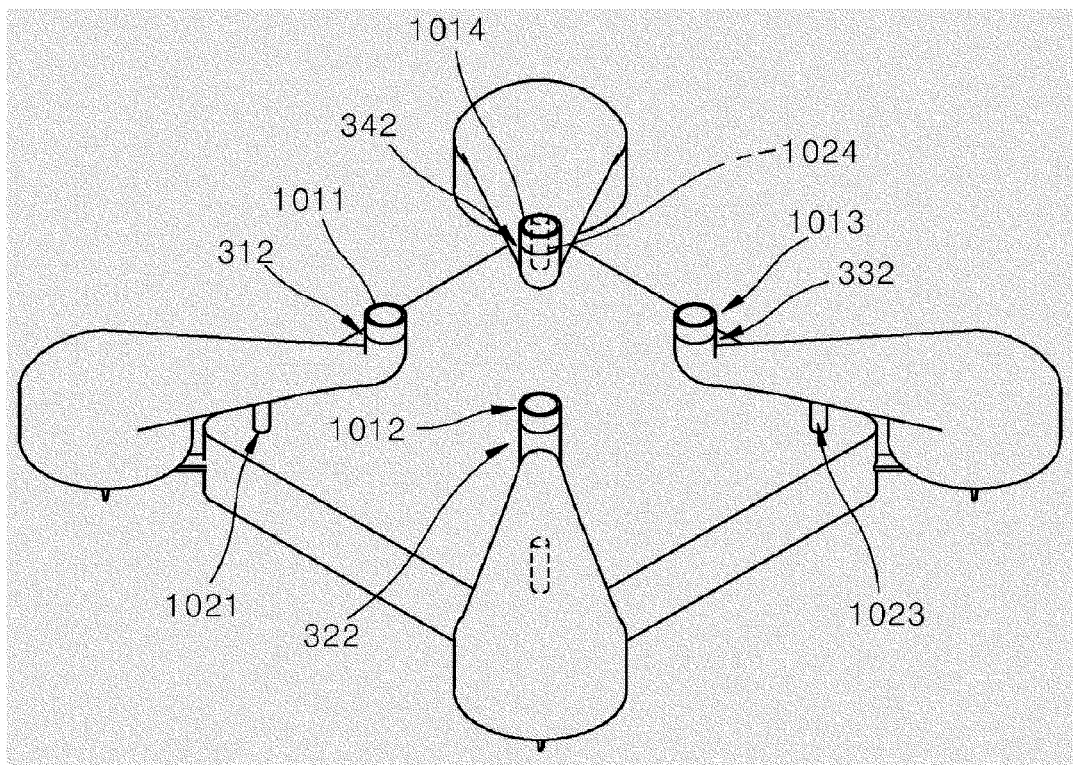
FIGS. 11 to 30 are views showing the movable device according to the modification of the third embodiment of the present disclosure.

FIG. 11 is a perspective view showing the movable device including the supply duct having the coupling part by which various modules are coupled to the movable device according to the second embodiment of the present disclosure.

A description that overlaps with the description of the preceding embodiment is omitted, and elements omitted in the other embodiments may exist.

Referring to FIG. 11, the second end 312 of the supply duct may be connected to a coupling part 1010 that may couple various modules to each other. As shown in FIG. 11, the coupling part may include four coupling parts 4 1011, 1012, 1013, and 1014, but the present disclosure may not be limited thereto. The coupling part is a device provided to be coupled to various modules, and may include all coupling methods, such as a simple insertion coupling method, a screw thread fastening method, etc. Meanwhile, the supply duct according to the embodiment may be fixed by the supply duct supporting portion 1020 extended from the movable device body 10. However, the supply duct support portion is not necessarily extended from the movable device body, and the supply duct support portion is not necessarily included in the movable device. Even when the supply duct is not supported by the supply duct supporting portion 1020 to the movable device body, it is sufficient that the supply duct is fixed to the movable device body directly and injects air into the rotor.

Figure 12:
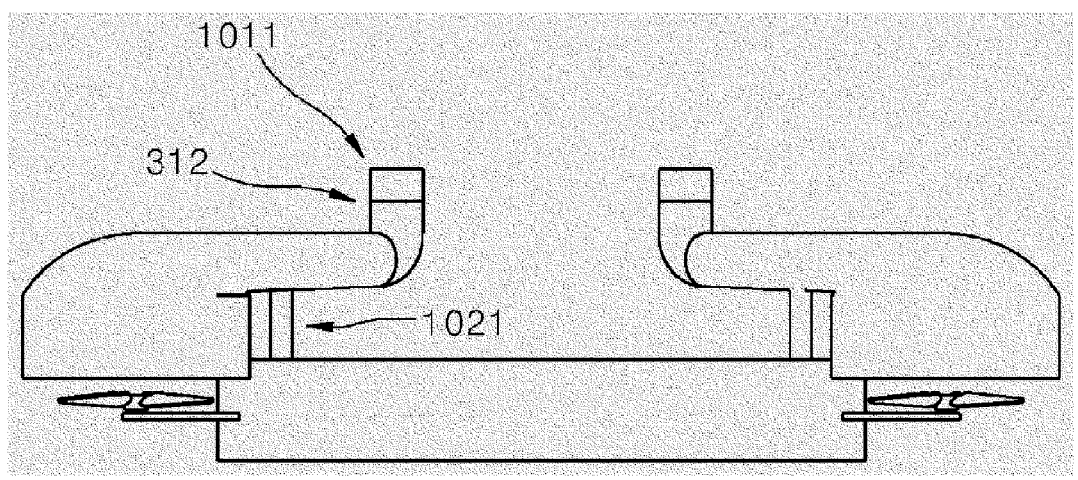

FIG. 12 is a front view showing the movable device including the supply duct having the coupling part by which a module may be coupled to the movable device according to the second embodiment of the present disclosure.

Figure 13:
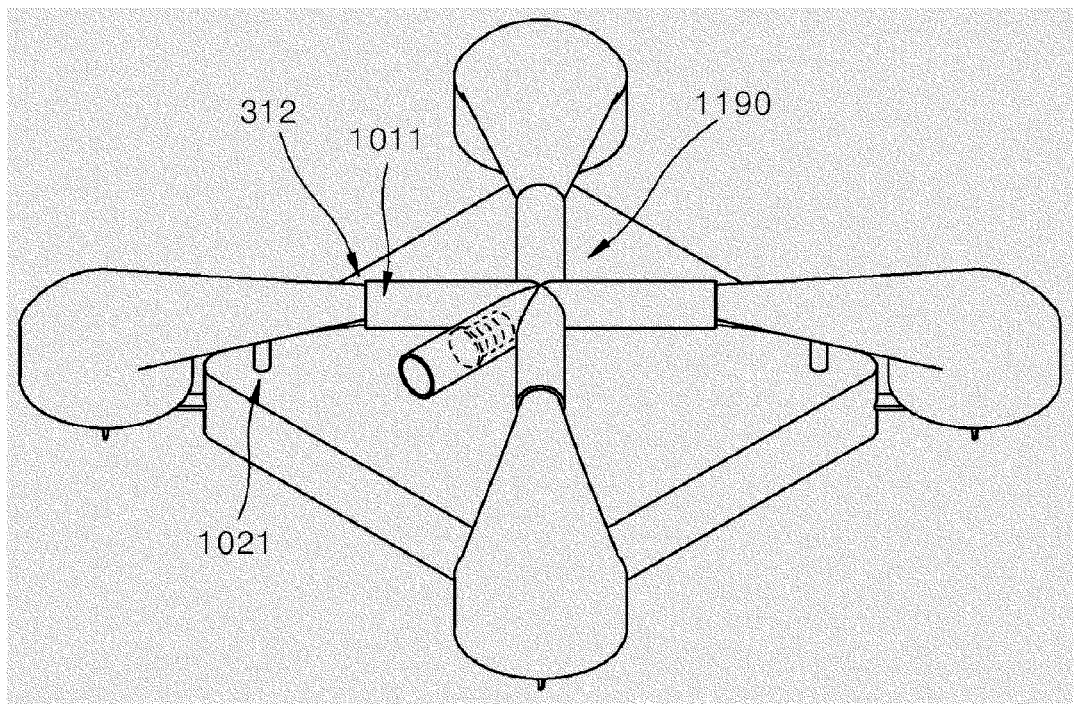

FIG. 13 is a view showing the movable device coupled to a launcher module 1190 that is one of modules that may be coupled to the supply duct of the movable device according to the second embodiment of the present disclosure.

The launcher module is provided to launch various objects that may be shot, such as a tennis ball or a ping-pong ball, a toy, or a lethal bullet, and may be compressed by a force of air suctioned through the second end of the supply duct and the launcher module may be released from the compressed state by the rotor control and the control for opening and closing the auxiliary opening provided at the first end of the supply duct. The method for releasing the compressed state according to the present disclosure is not limited to the above embodiment, and includes any control decreasing a volume of air suctioned through the second end of the supply duct.

Meanwhile, the second end 312 of the supply duct in FIG. 13 is opened horizontally to the main body part of the movable device, whereas the second end 312 of the supply duct in FIG. 11 is opened vertically to the main body part 11 of the movable device. As described above, the second end of the supply duct may be deflected in any direction according to a module to be coupled or a purpose. Moreover, as shown in FIG. 13, second ends of the supply ducts may be coupled to each other for performing efficiently a purpose. The above structure will be described later.

Figure 14:
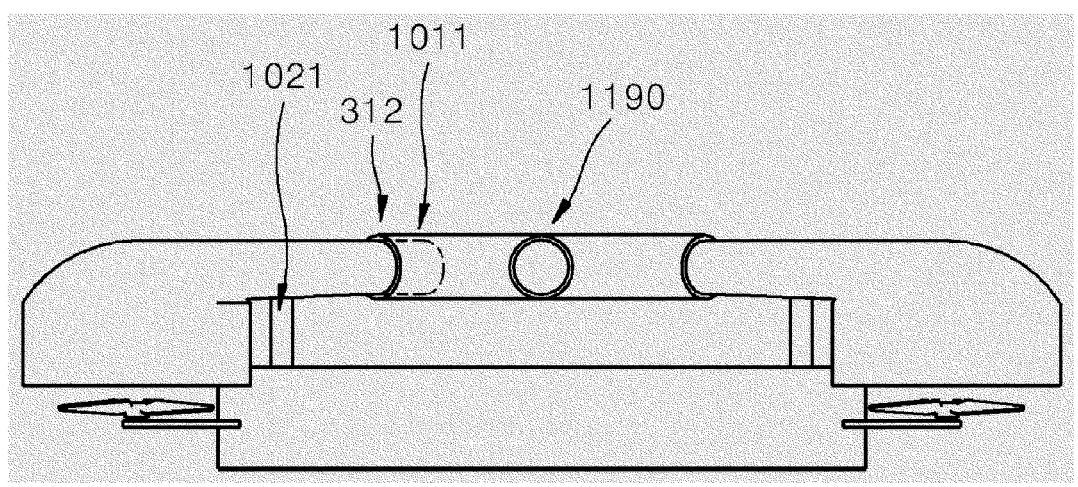

FIG. 14 is a front view showing the movable device with the launcher module that is one of modules that may be coupled to the supply duct of the movable device according to the second embodiment of the present disclosure.

Figure 15:
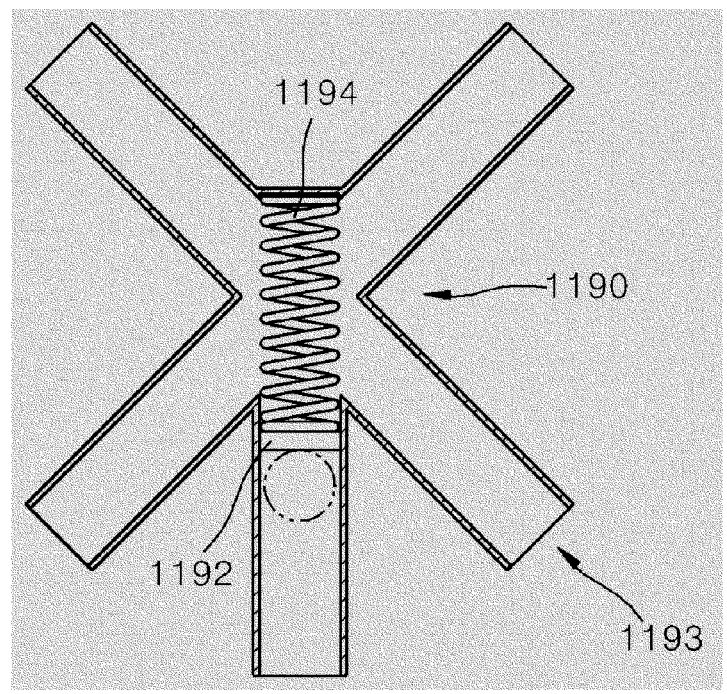

FIG. 15 is a plan view showing the launcher module that is one of modules that may be coupled to the supply duct of the movable device according to the second embodiment of the present disclosure.

The launcher module 1190 may compress a piston 1192 by using the supply duct. As shown in FIG. 15, the launcher module may have four module coupling parts 1193 to be connected to a plurality of supply ducts, but the number of the module coupling parts is not limited thereto, and the launcher module may have at least one module coupling part in response to flight purpose. A spring 1194 is shown as an elastic body generating elasticity in the launcher module, but the present disclosure is not limited thereto and may have various materials and shapes such as rubber. For example, focusing on the principle that the diaphragm of the human chest goes down and the alveoli expand, the diaphragm goes down by the suction force according to the present disclosure and negative pressure is generated in a space made of a rubber material, thereby ultimately generating a compressive force. The compressive force may be used to perform the mission.

Various modules as described above may be coupled to and removed from the movable device by the coupling part. When the modules do not perform the mission, the modules may be removed from the movable device and separately stored.

Figure 16:
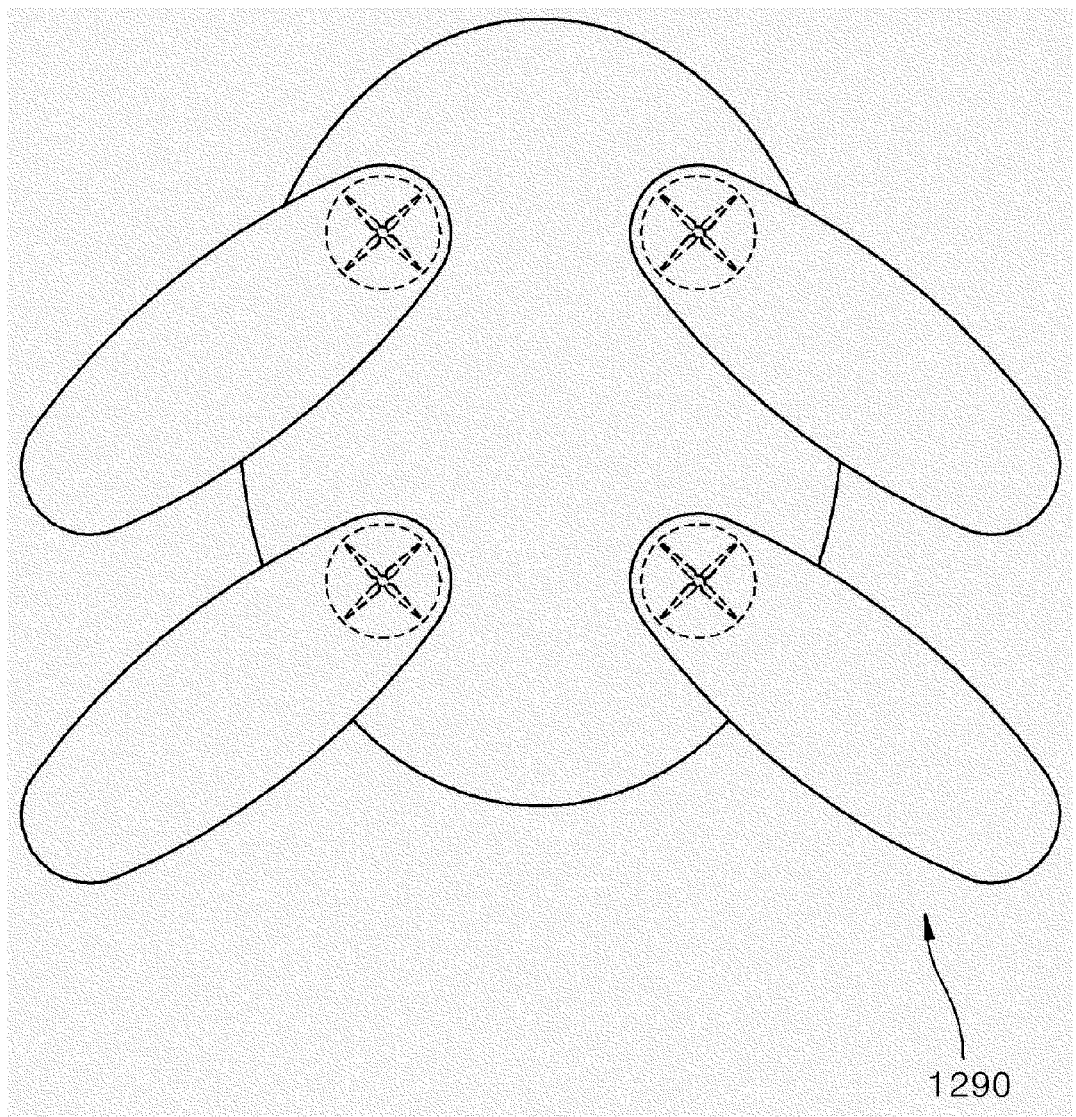
Figure 17:
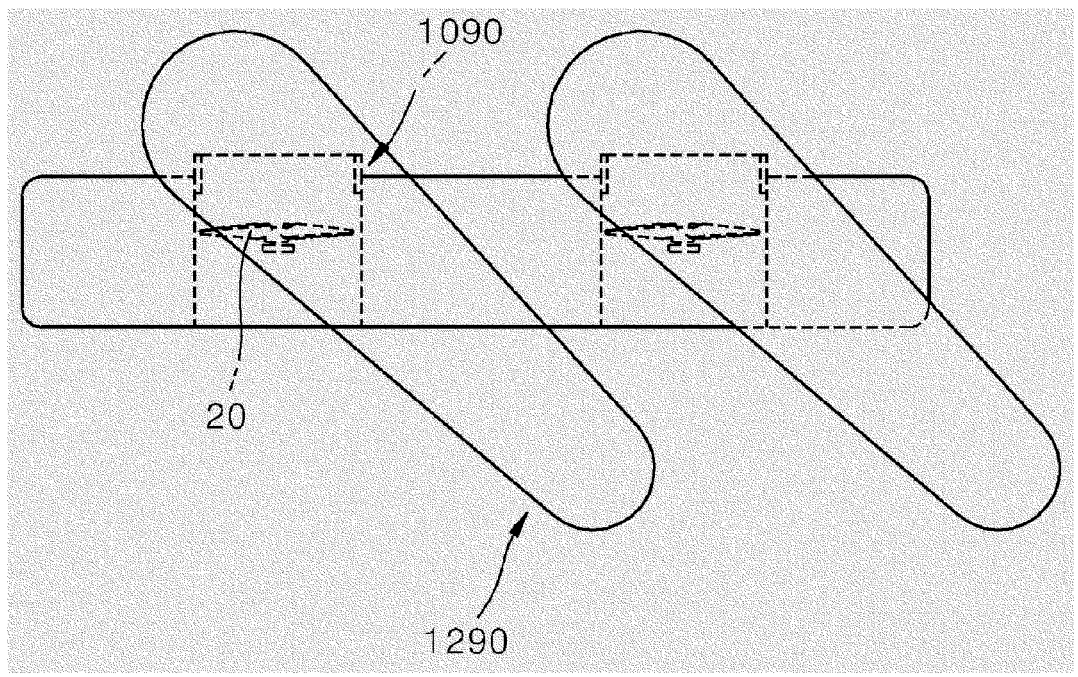
Figure 18:
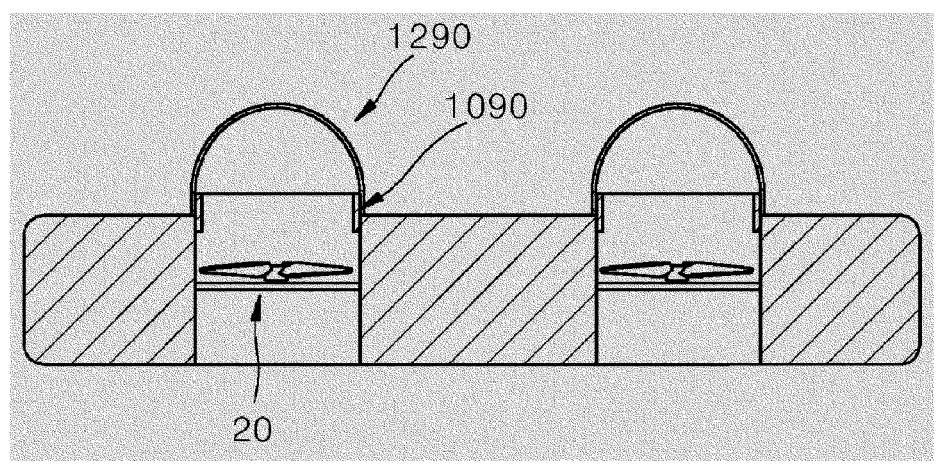

FIGS. 16 to 18 are views showing the movable device according to the second embodiment of the present disclosure, wherein a balloon robot arm that is one of the modules is coupled to the supply duct of the movable device.

The balloon robot arm 1290 is coupled to the coupling part of the supply duct and may perform forward movement, change of direction, etc. by performing expansion and contraction of the balloon robot arm in response to flow of air of the supply duct. The movable device with the balloon robot arm may be applied to endoscope equipment. In detail, an endoscope robot to which the movable device with the balloon robot arm according to the present disclosure is applied may pass through the intestine more quickly than a conventional endoscope robot by the expansion and contraction of the balloon robot arm after endoscope robot settles in the intestine. Meanwhile, the movable device with the balloon robot arm may fly in a relatively large organ, such as the stomach, by generating the lift force. The movable device with the balloon robot arm may be used in daily life as well as the human body treatment.

As shown in FIGS. 16 and 17, the balloon robot arm may be formed to be extended in the direction opposite to the heading direction of the movable device. Whereby, the movable device may perform forward movement and rotation movement efficiently by expansion and contraction of the balloon robot arm.

FIG. 18 is a section view showing the movable device in which the balloon robot arm that is one of the modules is coupled to the supply duct of the movable device according to the second embodiment of the present disclosure. The balloon robot arm may include a coupling part 1090 for being coupled in close to the rotor, and the shape of the coupling part follows the related art.

Meanwhile, the balloon robot arm may be made of various materials, such as rubber, but the present disclosure is not limited thereto, and may be any configuration that may repeat expansion and contraction like a cylinder.

Moreover, various modules that may be coupled to the second end of the supply duct exist, and for example, any devices using a fluid suction force, such as a pump, a cleaner, an air cleaner, etc., may be the modules.

As described above, the supply duct may have various shapes to be suitable for the mission of the movable device. The supply duct may be bent multiple times or may be configured such that a diameter of the supply duct may be changed as the supply duct goes in a direction from the first end thereof to the second end thereof. As in the embodiment disclosed in FIG. 13, second ends of the plurality of supply ducts are coupled to each other to generate one suction force. In addition, one first end may exist in one supply duct, and a plurality of second ends may exist therein. Therefore, the movable device may suction fluid in a plurality of directions through multiple second ends located at an outer side, an inner side, an upper side, etc. of the movable device body.

Figure 19:
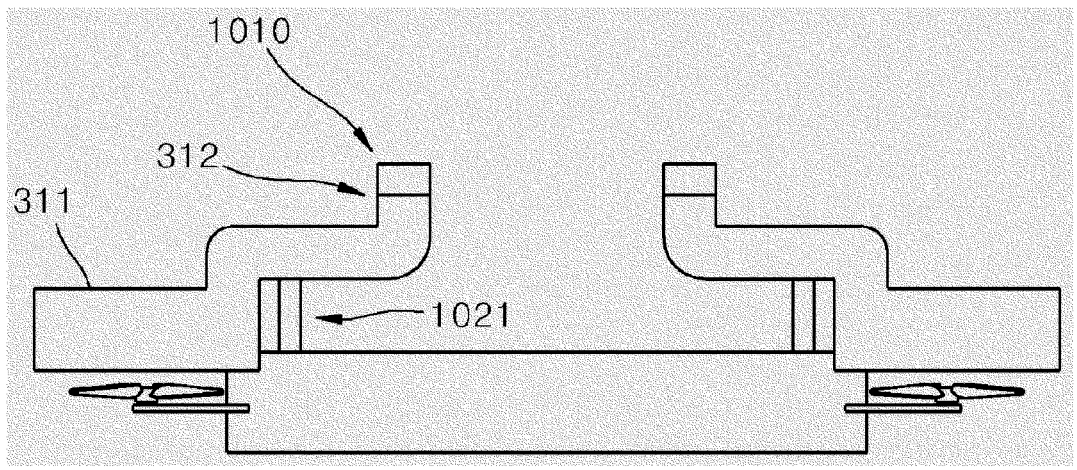

FIG. 19 is a front view showing the movable device including the supply duct that has different diameters at the first and second ends as described above.

Referring to FIG. 19, a diameter of the first end 311 of the supply duct located above the rotor is large enough to cover the entire rotor, but a diameter of the second end 312 of the supply duct is smaller than the diameter of the first end 311 of the supply duct. Therefore, the present disclosure to which the supply duct is applied may have stronger suction force. In detail, the present disclosure may supply the strong suction force to a module that is coupled to the second end of the supply duct via the coupling part 1010.

Figure 20:
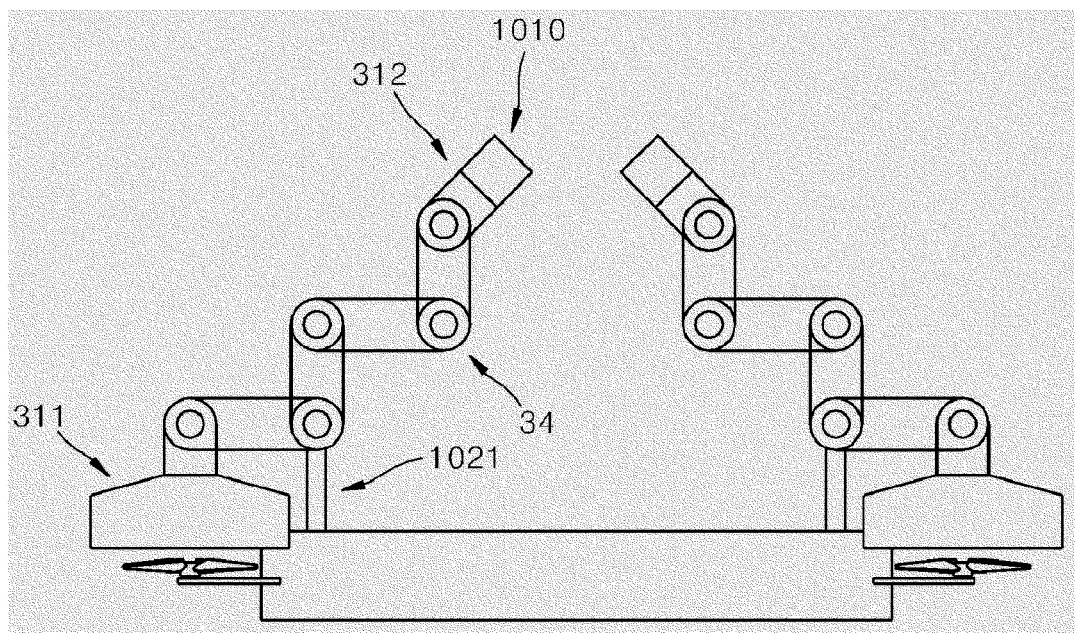

FIG. 20 is a front view showing the movable device including the supply duct with a various shapes according to the above description.

Referring to FIG. 20, the movable device may have a supply duct joint 34 so that the supply duct may be bent multiple times. The joint may be rotated every directions of up, down, left, and right, and as described above, the joint may suction any fluid, such as gas, liquid, etc., in any direction, such as inward direction, outward direction, upward direction, downward direction, etc. based on the movable device body.

Figure 21:
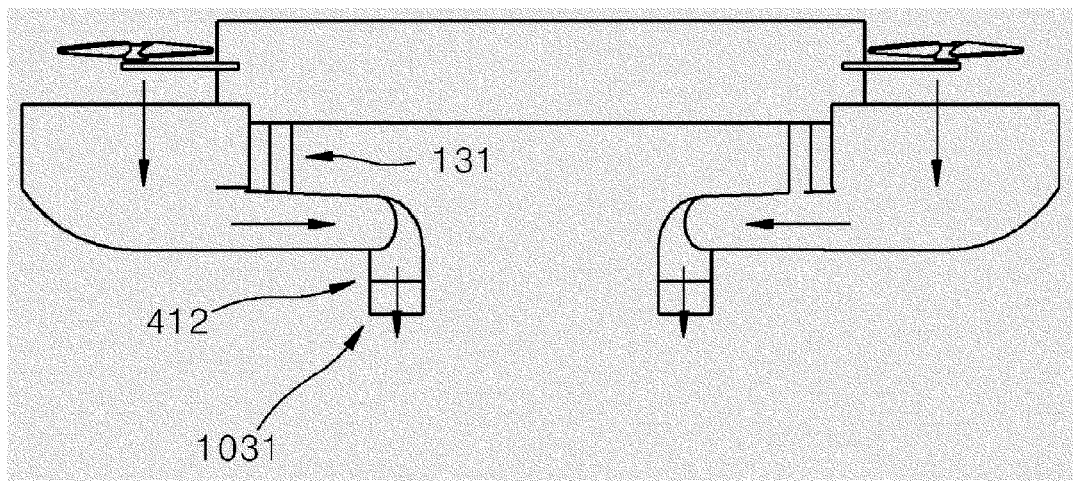

FIG. 21 is a front view showing the movable device according to the second embodiment of the present disclosure, wherein the movable device including the return duct having the coupling part that may couple a module to the movable device.

Everything about the supply duct described above may also be applied to the return duct 40. The return duct may have a coupling part 1031 that may be coupled to a module capable of a predetermined mission at the second end 412 of the return duct. Unlike the supply duct, the return duct may generate a jet force from the second end of the return duct instead of the suction force. As described above, the present disclosure may be freely applied to a module that may be used by the jet force of the return duct. For example, the module may be a hair dryer, a fan, a dispenser, a pesticide sprayer, etc. Detailed descriptions about various modules will be omitted because those skilled in the art can imagine, and the present disclosure focuses a method of obtaining the jet force.

Meanwhile, a module or a device for a mission may be provided in the supply duct and the suction duct. For example, a turbine (not shown) capable of generating energy from a flow of fluid is mounted to each of the inside of the supply duct and the inside of the suction duct, so that the rotation of the turbine in the supply duct and the suction duct may generate electricity. For example, the propeller may be realized in the supply duct and the suction duct, and a tachometer or an encoder (not shown) may be connected to or provided at the propeller, to measure wind speeds in the supply duct and the suction duct. Furthermore, a dust absorber etc. provided on inner circumferential surfaces of the supply duct and the suction duct may clean air.

In the specification, it is described that the modules that may be coupled to the movable device are coupled to an outer portion of the movable device, but the present disclosure is not limited thereto, and may be located inside the movable device. In the specification, the modules coupled to the movable device via the coupling part are independent in coupling positions thereof.

In addition, it is described that the coupling part is fixed to the second end of the supply duct or the second end of the return duct, but the present disclosure is not limited thereto, and the coupling part may be removably separated from the second end of the supply duct or the second end of the return duct.

Figure 22:
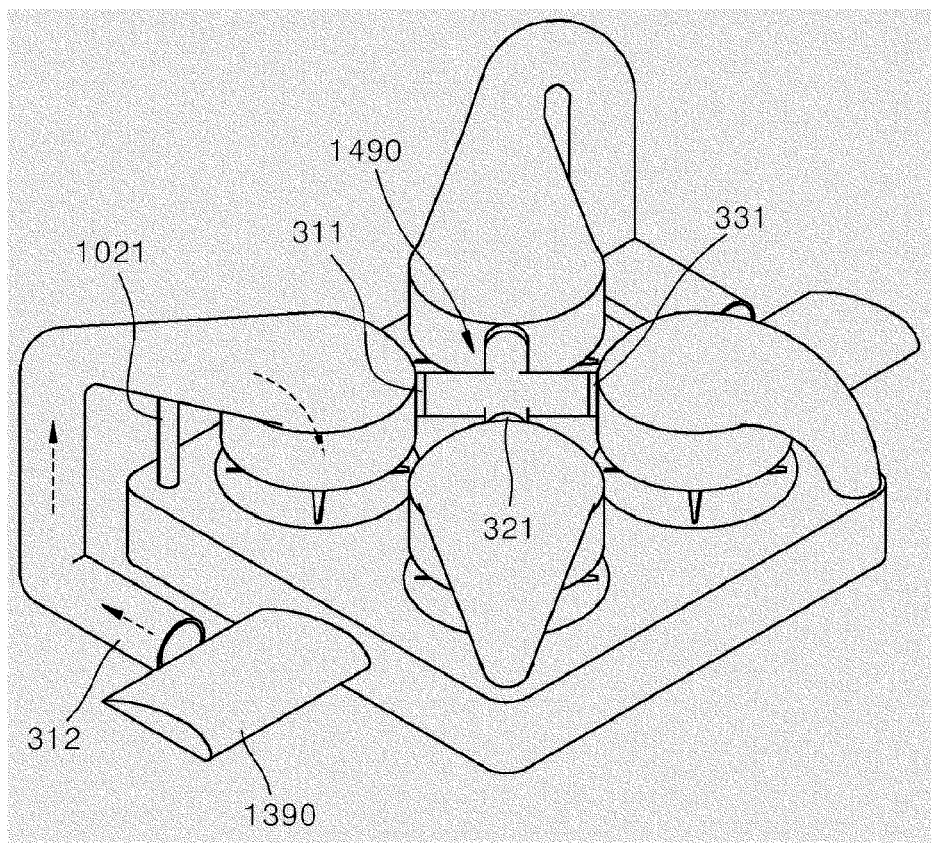

FIG. 22 is a perspective view showing the movable device to which a fixed blade is coupled according to the second embodiment of the present disclosure.

Figure 23:
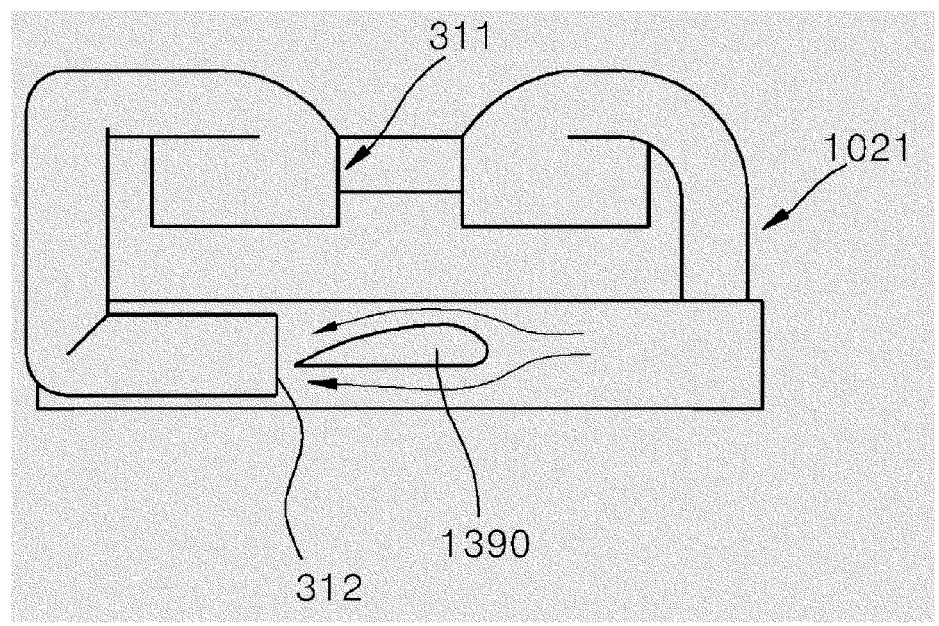

Referring to FIG. 22, the movable device may include the fixed blade 1390 at a predetermined location, and may generate lift force by locating the second end 312 of the supply duct at the rear end of the fixed blade. FIG. 23 is a side view showing the movable device according to the second embodiment of FIG. 22. Referring to FIG. 23, air is suctioned through the second end 312 of the supply duct, and the suctioned air is divided by an airfoil of the fixed blade. Therefore, lift force may be generated on an upper surface of the airfoil, thereby allowing the movable device to float upward.

Meanwhile, as shown in FIG. 22, in order to generate a more powerful lift force to the fixed blade, the movable device may include a combination part 1490 that may couple the first ends 311, 321, 331, and 341 of the plurality of supply ducts to each other. A method of coupling the first end of the supply duct to the combination part may vary and a detailed description thereof will be omitted.

Figure 24:
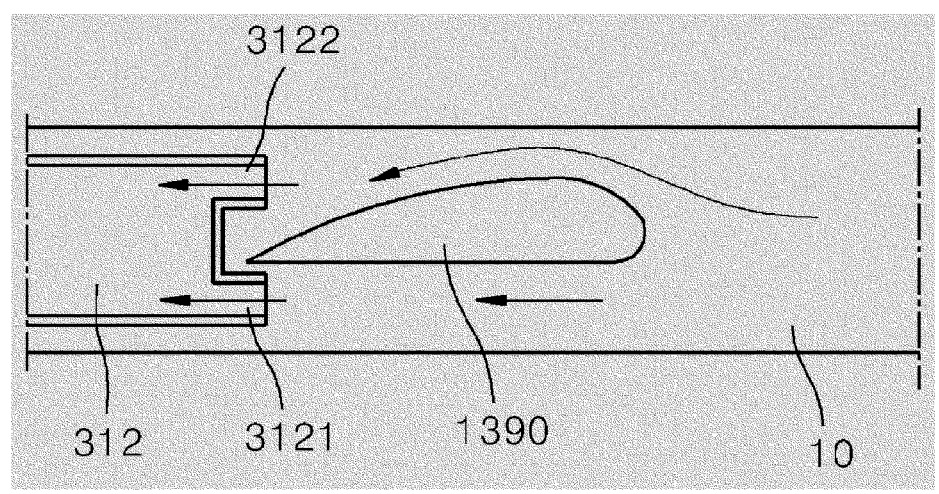

Meanwhile, the second end of the supply duct may be arranged variously to the fixed blade. As shown in FIG. 24, the second end 312 of the supply duct may be arranged to be divided into two portions. Moreover, a second second-end 3122 may have a diameter or a sectional area different from a first second-end 3121, so that a flow of air passing through the upper end of the fixed blade may be faster than a flow of air passing through a lower end thereof. Therefore, the movable device may achieve even greater lift force according to Bernoulli's law. As described above, the second end of the supply duct may be arranged variously to the fixed blade, and for example, the second end of the supply duct may be fixed to the fixed blade, and may be arranged to elongate in a longitudinal direction of the fixed blade (not shown). When the second end of the supply duct is arranged at a front end of the fixed blade and the suction force acts, the movable device body may be moved forward by the reaction force of the suction force, so that the lift force may be generated from the fixed blade (not shown).

Figure 25:
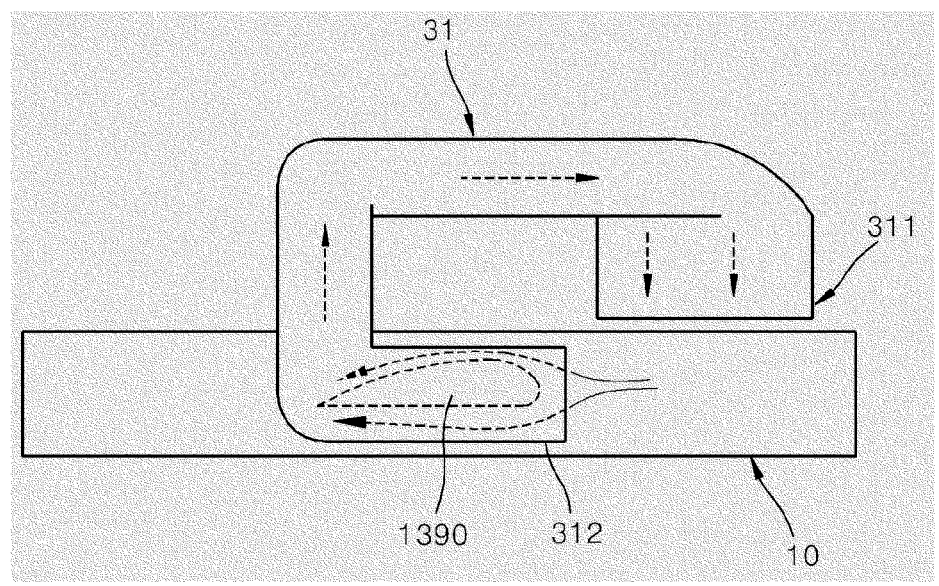
Figure 26:
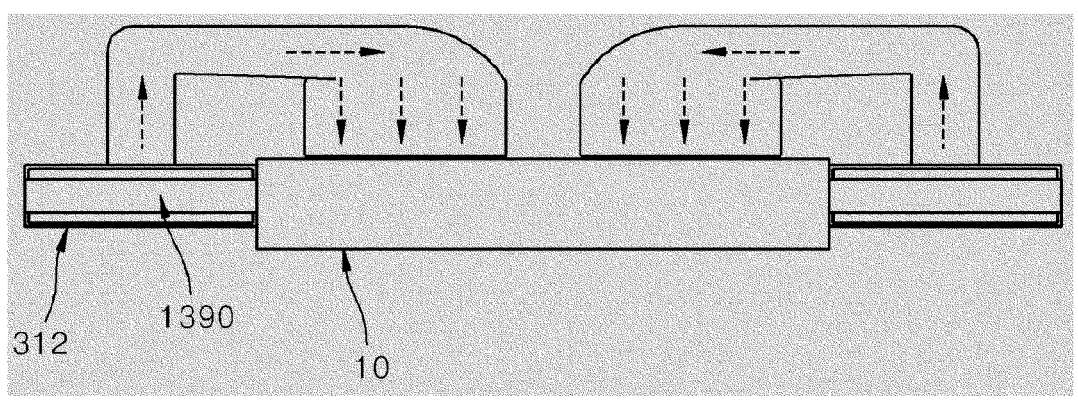

As described above, the fixed blade may be arranged in the supply duct. FIG. 25 is a view illustrating the movable device by using the side view according to the second embodiment in FIG. 22. Referring to FIG. 25, it is possible to prevent damages due to a collision between the fixed blade located at the outside of the movable device and an outer object, as the fixed blade is arranged in the supply duct, and simultaneously, the lift force may be obtained. FIG. 26 is a front view showing the movable device according to the embodiment of the present disclosure.

Figure 27:
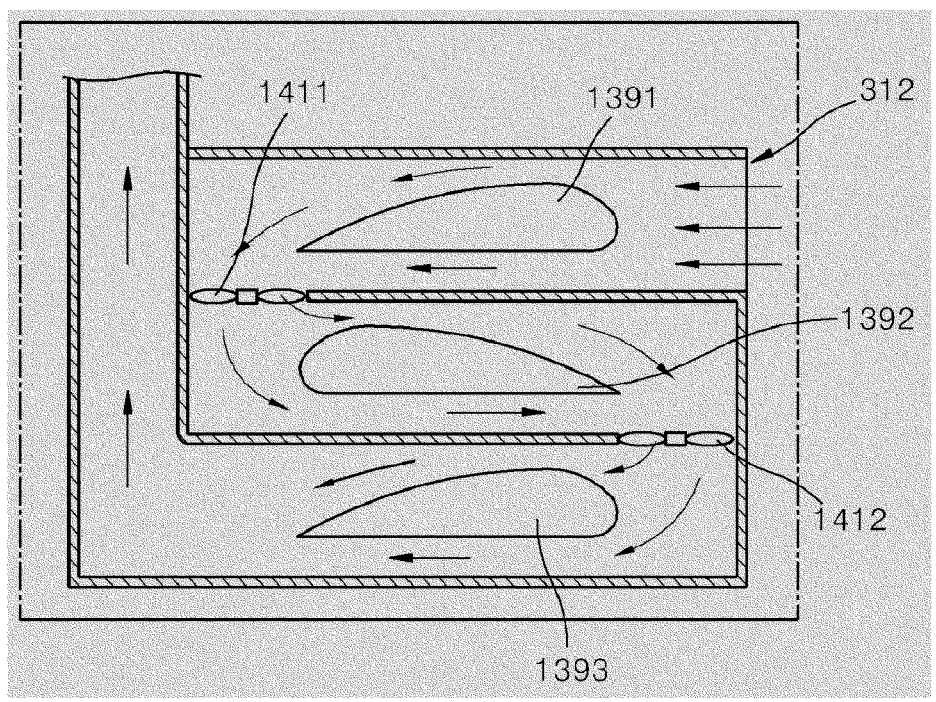

The movable device may achieve more powerful lift force as a plurality of fixed blades is provided in the supply duct. Referring to FIG. 27, a first fixed blade 1391, a second fixed blade 1392, a third fixed blade 1393 are arranged in opposite directions in order to generate the lift force according to a flow of air. As shown in FIG. 26, a plurality of rotors 1410 may be included in the supply duct to allow air to flow smoothly.

Figure 28:
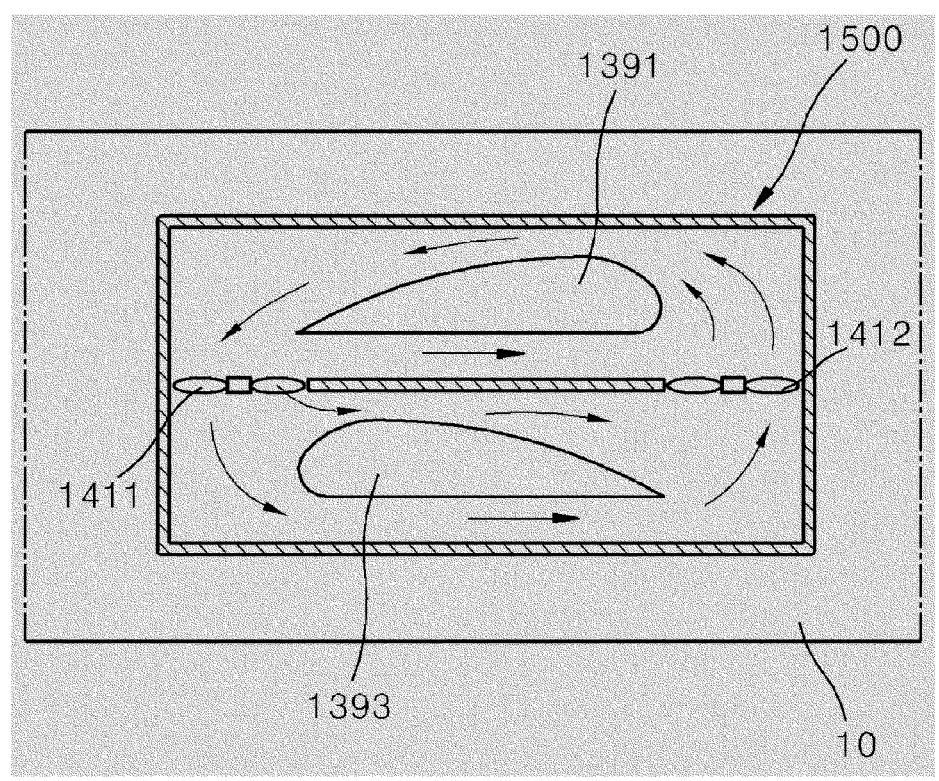

The supply duct in which the fixed blades are arranged may be rotated via the shaft, thereby generating thrust force. Referring to FIG. 28, the supply duct may be fixed to a shaft 1080 protruding on the movable device body, and as shown in FIG. 28, when the supply duct is rotated on the shaft, lift force may be reduced and thrust force may be generated instead. Similar to FIG. 23, the supply duct with the fixed blade installed therein may be arranged at each of left and right sides of the movable device body, and the supply duct may be rotated on the shaft so that the fixed blades may respectively generate lift force and thrust force as desired. As a result, the movable device may be rotated at its regular position and may be flight-controlled even in any direction of upward, downward, leftward, and rightward directions. The change of length of the supply duct caused by the rotation of the supply duct may be solved through various methods disclosed in the related art, such as the principle of bellows, and a method in which the supply duct is fixed and rotated to the movable device body follows the conventional method.

Figure 29:
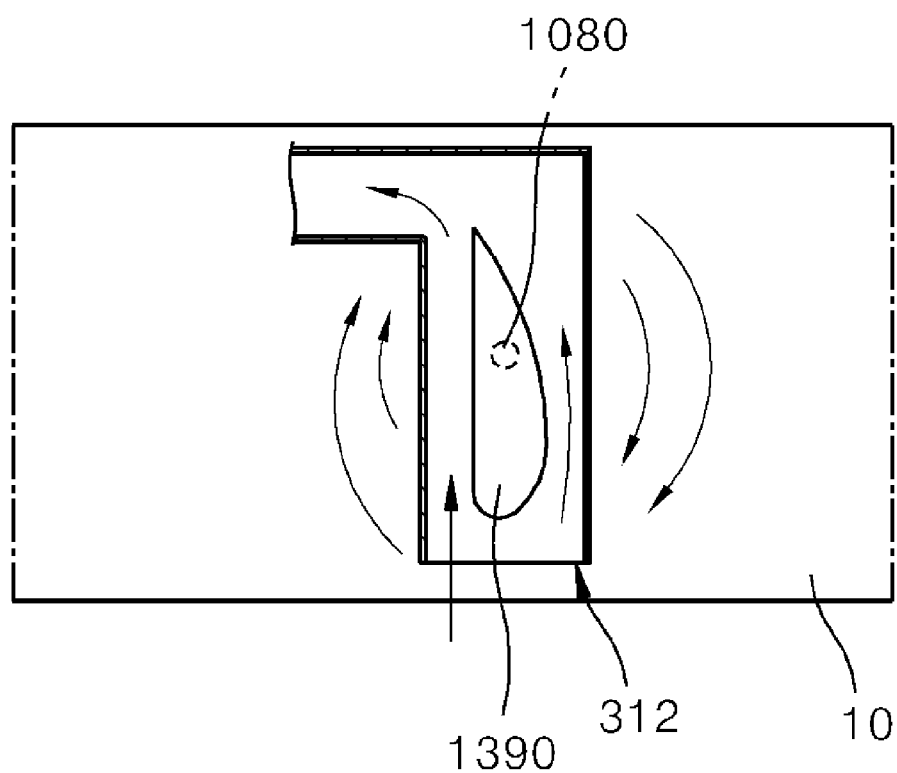

Moreover, at least two fixed blades are arranged in a sealed space to generate lift force and thrust force. FIG. 29 is a concept view relative to the side view of the movable device according to the third embodiment of the present disclosure. Referring to FIG. 29, air may be circulated by the rotor in the sealed space to generate a force in a predetermined direction. The force in the predetermined direction may be used as lift force or thrust force, and a mechanism thereof is as disclosed in FIG. 27. The sealed space as described above may be rotated as shown in FIG. 28. As described above, the present disclosure is not limited to arrangement of the fixed blade in the supply duct and may be extended such that the fixed blade is arranged in the return duct. However, it is not necessary to have at least two fixed blades, and at least one fixed blade is sufficient.

Figure 30:
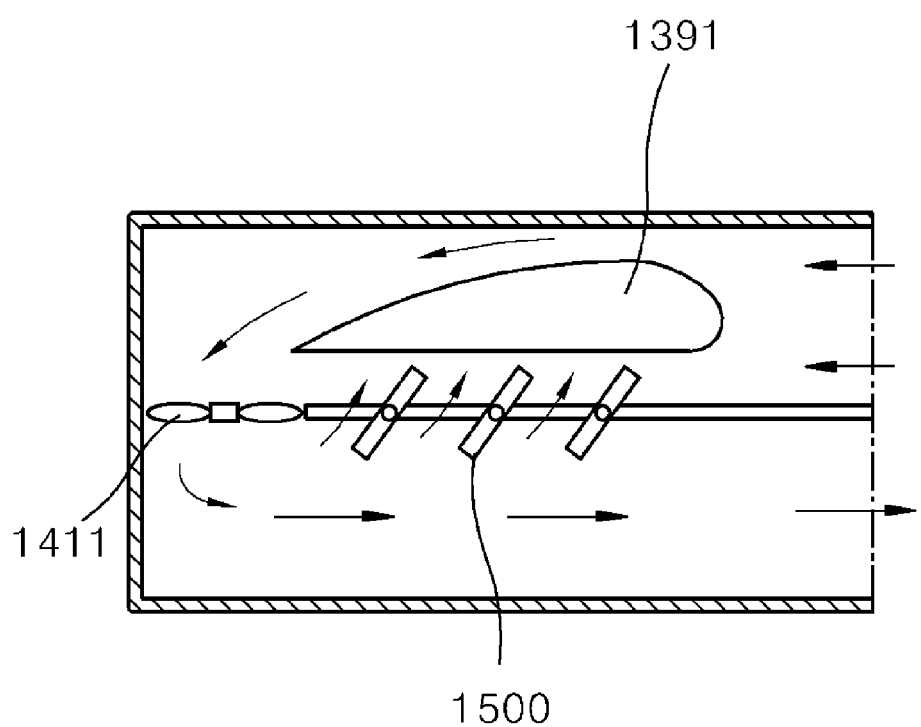

FIG. 30 is a view that is obtained by extending the concept disclosed in FIG. 29. Referring to FIG. 30, the air that has passed through the fixed blade and circulated may be introduced toward a lower side of the fixed blade again via a guide 1500 like a louver. Therefore, lower air density of the fixed blade is higher and more lift force may be generated. Thus, it is possible to adjust lift force only by controlling the guide to be used for flight control. The guide may be opened and closed by an actuator, etc. In FIG. 30, it is shown that a fixed blade 1391 is provided at an upper space based on a partition in the supply duct, but like FIG. 28, an additional fixed blade (not shown) may be provided at a lower space based on the partition. Air density at an upper side of the fixed blade provided in the lower space may be further lowered by the guide to generate more powerful lift force. In addition, the desired lift force may be generated by using a separate rotor corresponding to the guide.

Meanwhile, throughout the specification, it is disclosed that the supply duct is located at the rear end of the fixed blade, but it is sufficient that the fixed blade may be located anywhere in a flow of air to generate lift force. For example, the fixed blade may be located anywhere where fluid may flow relatively quickly, such as the inside of the coupling part, the inside of the mooring space, the periphery of the suction duct, the periphery of the return duct, the periphery of the discharge duct, etc. The speed of fluid may be changed by increasing or reducing a diameter of a nozzle. The second end of the return duct or the first end of the supply duct may be arranged at the front end of the fixed blade to generate lift force.

Throughout the specification, the fixed blade is disclosed as the configuration for generating lift force, but the present disclosure is not limited to the fixed blade, and it is sufficient that the a force of a predetermined direction may be generated in response to a flow of fluid. For example, polyhedrons such as cylinders and spheres may be rotated instead of the fixed blade to enjoy the Magnus effect or Coanda effect. However, the configuration does not necessarily have to be rotated and may be sufficient even with a fixed cylinder or sphere.

In addition, the rotation force generated by the rotor may be used by being transmitted to the module coupled to the movable device via a clutch that is a known conventional configuration. Through various configurations, the rotation force may be changed into linear movement, and the rotation force may be transmitted by being changed a desired degree of the force of the module by a transmission. Whereby, power may be supplied to every modules requiring power, the present disclosure may be applied any device a laundry dryer, a washing machine, an air circulator, a mixer, a drill, and an air pump such as. Various gears and clutches may be used for the rotation force and suction force of the rotor to be applied simultaneously.

In the description of the movable device 3 according to the third embodiment of the present disclosure, contents about other elements excluding the contents described are equal to the contents in the movable device 1 according to the embodiment of the present disclosure, so description thereof will be substituted by the description of the movable device 1.

Hereinabove, even when all the elements constituting the embodiment of the present disclosure are coupled to each other or operated while being integrated into a single body state, the present disclosure is not necessarily limited to the embodiment. Within the scope of the purpose of the present disclosure, all components may be operated selectively in combination with one or more. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although the invention is described with reference to specific items such as specific structural elements, to merely some embodiments, and to drawings, such specific details disclosed herein are merely representative for purposes of helping more comprehensive understanding of the present disclosure. The present disclosure, however, is not limited to only the example embodiments set forth herein, and those skilled in the art will appreciate that the present disclosure can be embodied in many alternate forms. Accordingly, the present disclosure is intended to cover not only the exemplary embodiments, but also various alternatives, modifications, equivalents and other embodiments that may be included within the spirit and scope of the present disclosure as defined by the appended claims.

INDUSTRIAL APPLICABILITY

The present disclosure may provide the movable device that may be coupled to various modules and uses lift force, thrust force, rotation force etc.

The invention claimed is:

1. A movable device comprising:
a lift generating unit configured to generate a pressure difference between opposite sides thereof to generate lift force;
a movable device body connected to the lift generating unit to be movable by means of the lift force generated by the lift generating unit; and
a supply duct of which the number corresponds to the number of the lift generating unit, the supply duct having a first end that is arranged on a first side of the lift generating unit, and a second end that suctions fluid to supply the fluid into the lift generating unit when the lift generating unit is operated,
wherein the lift generating unit is a rotor configured to rotate to generate the pressure difference between an upper side and a lower side of the lift generating unit, so that the lift force is generated,
the supply duct is disposed to cover the lift generating unit so that the lift generating unit is concealed under the supply duct when it is seen in a downward direction from an above view of the supply duct,
the supply duct is provided with an opening facing toward the lift generating unit at the first end, and
the supply duct supplies the fluid suctioned through the second end to the lift generating unit through the opening in the downward direction.

2. The movable device of claim 1, wherein the rotor is rotatably connected to the movable device body.

3. The movable device of claim 2, further comprising:
a tubular suction duct,
wherein the second end of the supply duct is connected to the suction duct and is configured to suction the fluid from an outside of the movable device through the suction duct.

4. The movable device of claim 2, further comprising:
a return duct arranged at a second side of the rotor, and configured to guide the fluid discharged from the rotor in one direction.

5. The movable device of claim 4, further comprising:
a discharge duct connected to the return duct, and configured to discharge the fluid guided along the return duct to the outside.

6. The movable device of claim 2, wherein the supply duct is movably connected to the movable device body and configured to be deviated from the first side of the rotor or to be located at the first side of the rotor selectively.

7. The movable device of claim 4, wherein the return duct is movably connected to the movable device body and configured to be deviated from the second side of the rotor or to be located at the second side of the rotor selectively.

8. The movable device of claim 6, further comprising:
a controller configured to control posture of the movable device body by controlling a location of the supply duct corresponding to the rotor.

9. The movable device of claim 5, further comprising:
a plurality of suction ducts connected to the movable device body, the plurality of suction ducts being open toward the outside,
wherein the second end of the supply duct is connected to one of the suction ducts to suction the fluid through the suction duct,
the discharge duct comprises a plurality of discharge parts, and
the plurality of suction ducts and the plurality of discharge parts are arranged at outside surfaces included in the movable device body, and
the movable device further comprising:
a controller configured to control a degree of opening of the plurality of suction ducts and a degree of opening of the plurality of discharge parts so that the fluid is suctioned through one of the plurality of suction ducts arranged at an outside surface of the movable device body facing in a desired direction, and the fluid is discharged to the outside through one of the plurality of discharge ducts, arranged at an outside surface of the movable device body facing in a direction opposite to the desired direction.

10. The movable device of claim 9, wherein the supply duct penetrates the movable device body to be connected to the suction duct in the movable device body, and the return duct penetrates the movable device body to be connected to the discharge duct in the movable device body.

11. The movable device of claim 2, wherein the supply duct further comprises an auxiliary opening connected to the outside to receive the fluid from the outside and deliver the fluid to the first side of the rotor.

12. The movable device of claim 2, wherein the supply duct is arranged to cover a side surface of the rotor.

* * * * *